(12) United States Patent  
Yamamoto

(10) Patent No.: US 12,236,674 B2
(45) Date of Patent: Feb. 25, 2025

(54) COMPUTER-READABLE RECORDING MEDIUM STORING INFERENCE PROGRAM, COMPUTER-READABLE RECORDING MEDIUM STORING LEARNING PROGRAM, INFERENCE METHOD, AND LEARNING METHOD

(71) Applicant: FUJITSU LIMITED, Kawasaki (JP)

(72) Inventor: Takuma Yamamoto, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 353 days.

(21) Appl. No.: 17/857,087

(22) Filed: Jul. 4, 2022

(65) Prior Publication Data

US 2023/0127469 A1     Apr. 27, 2023

(30) Foreign Application Priority Data

Oct. 26, 2021  (JP) .................................. 2021-174706

(51) Int. Cl.
*G06V 10/774*    (2022.01)
*G06T 7/11*    (2017.01)
(Continued)

(52) U.S. Cl.
CPC .............. *G06V 10/774* (2022.01); *G06T 7/11* (2017.01); *G06T 7/194* (2017.01); *G06V 20/52* (2022.01); *G06T 2207/20081* (2013.01)

(58) Field of Classification Search
CPC ...... G06V 10/774; G06V 20/52; G06T 7/194; G06T 7/11; G06T 2207/20081
See application file for complete search history.

(56) References Cited

U.S. PATENT DOCUMENTS 11,276,177 B1 *  3/2022  Tsai ........................ G06T 7/174
2010/0055654 A1   3/2010  Yokono et al.
(Continued)

FOREIGN PATENT DOCUMENTS

GB          2476258 A     6/2011
JP       2010-061415 A    3/2010
(Continued)

OTHER PUBLICATIONS

Extended European Search Report dated Nov. 7, 2022 for corresponding European Patent Application No. 22182201.8, 8 pages.

*Primary Examiner* — Qun Shen
(74) *Attorney, Agent, or Firm* — Fujitsu Intellectual Property Center

(57) ABSTRACT

A non-transitory computer-readable recording medium stores an inference program for causing a computer to execute processing including: acquiring a background image in which a target area in which an object is arranged is captured, and a target image in which the object and the area are captured; generating an intermediate feature by inputting the background image and the target image to a feature extraction model; generating a mask image that indicates a region of an object that does not exist in the background image but exists in the target image by inputting the intermediate feature to a generation model; and specifying the object that does not exist in the background image but exists in the target image by inputting the generated mask image and intermediate feature to an estimation model.

4 Claims, 23 Drawing Sheets

(51) Int. Cl.
*G06T 7/194* (2017.01)
*G06V 20/52* (2022.01)

(56) References Cited

U.S. PATENT DOCUMENTS

| | | | | |
|---|---|---|---|---|
| 2011/0177841 | A1* | 7/2011 | Attwood | G06T 7/254 |
| | | | | 455/556.1 |
| 2012/0092495 | A1 | 4/2012 | Yano | |
| 2015/0248586 | A1 | 9/2015 | Gaidon et al. | |
| 2019/0050190 | A1* | 2/2019 | Murphy | G06F 9/451 |
| 2019/0236394 | A1* | 8/2019 | Price | G06V 10/945 |
| 2021/0027470 | A1* | 1/2021 | Lin | G06T 11/60 |
| 2021/0314531 | A1* | 10/2021 | Jo | G06V 20/52 |
| 2021/0383616 | A1* | 12/2021 | Rong | G06N 3/08 |
| 2022/0237799 | A1* | 7/2022 | Price | G06T 7/174 |
| 2023/0122623 | A1* | 4/2023 | Zhang | G06T 11/00 |
| | | | | 382/100 |

FOREIGN PATENT DOCUMENTS

| | | |
|---|---|---|
| JP | 2015-167017 A | 9/2015 |
| JP | 2019-153057 A | 9/2019 |
| JP | 2020-119154 A | 8/2020 |
| WO | 2019/032307 A1 | 2/2019 |

\* cited by examiner

FIG. 4
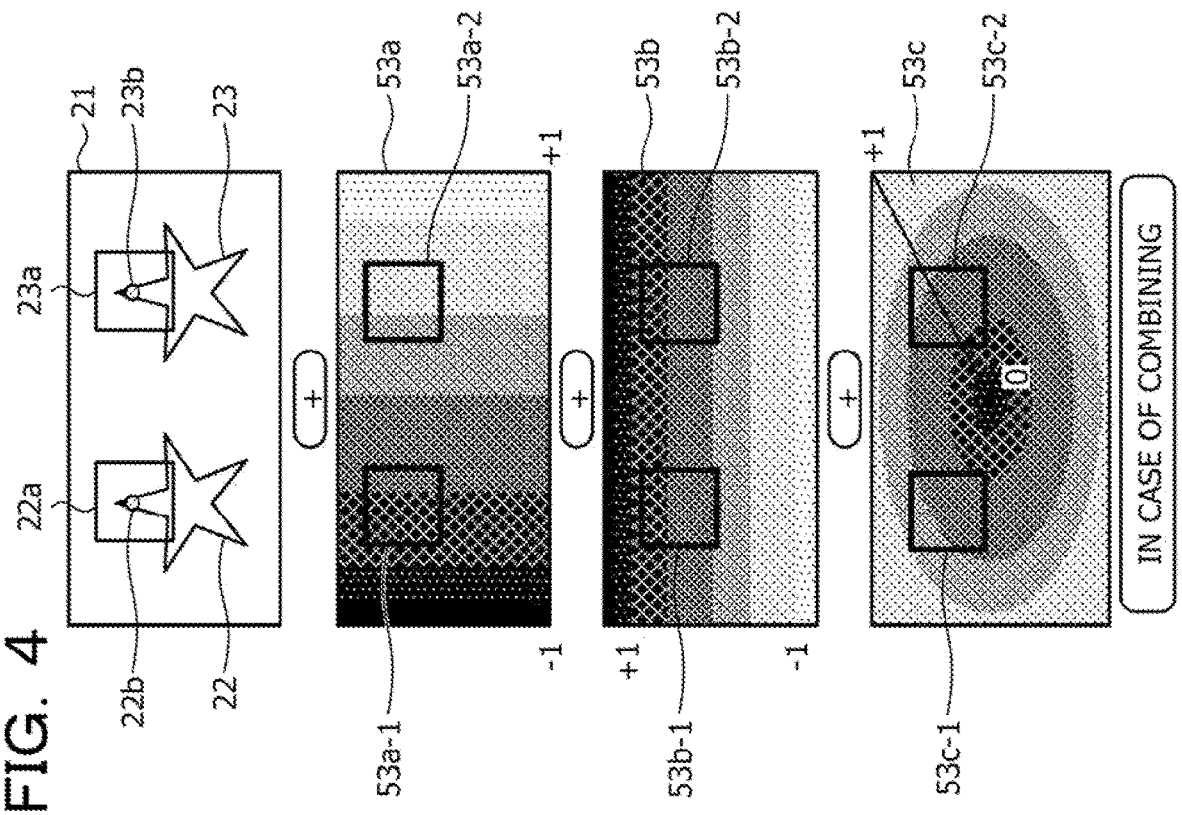
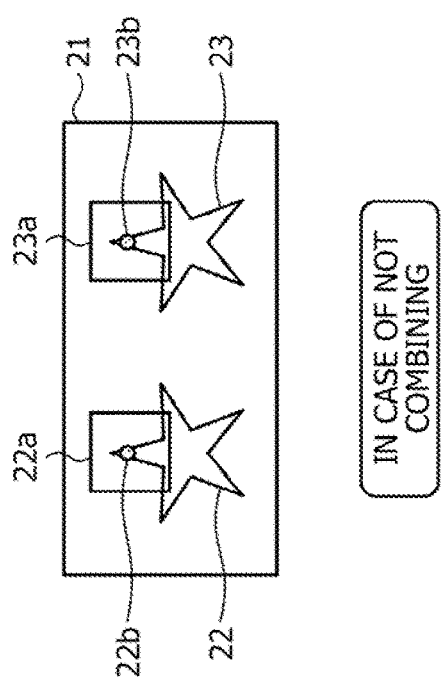

FIG. 7

| ITEM NUMBER | INPUT DATA | | CORRECT ANSWER DATA (GT) | |
|---|---|---|---|---|
| | BACKGROUND IMAGE DATA FOR LEARNING | TARGET IMAGE DATA FOR LEARNING | GT OF MASK IMAGE | GT OF BBOX |
| 1 | BACKGROUND IMAGE DATA (1) | TARGET IMAGE DATA (1) | MASK IMAGE (1) | BBOX(1) |
| 2 | BACKGROUND IMAGE DATA (2) | TARGET IMAGE DATA (2) | MASK IMAGE (2) | BBOX(2) |
| 3 | BACKGROUND IMAGE DATA (3) | TARGET IMAGE DATA (3) | MASK IMAGE (3) | BBOX(3) |
| ... | ... | ... | ... | ... |

FIG. 14

| ITEM NUMBER | INPUT DATA | | CORRECT ANSWER DATA (GT) 241 |
|---|---|---|---|
| | BACKGROUND IMAGE DATA FOR LEARNING | TARGET IMAGE DATA FOR LEARNING | GT OF BBOX |
| 1 | BACKGROUND IMAGE DATA (1) | TARGET IMAGE DATA (1) | BBOX(1) |
| 2 | BACKGROUND IMAGE DATA (2) | TARGET IMAGE DATA (2) | BBOX(2) |
| 3 | BACKGROUND IMAGE DATA (3) | TARGET IMAGE DATA (3) | BBOX(3) |
| ... | ... | ... | ... |

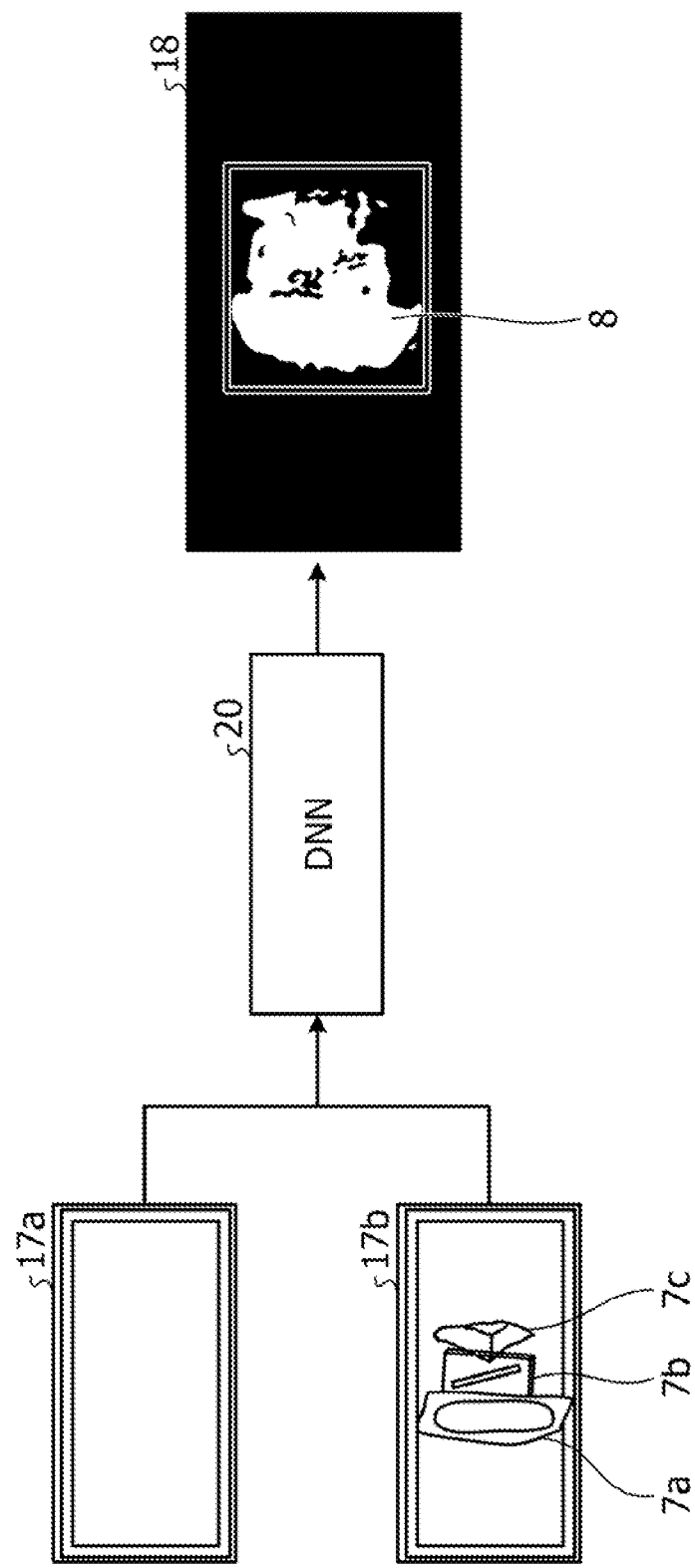

COMPUTER-READABLE RECORDING MEDIUM STORING INFERENCE PROGRAM, COMPUTER-READABLE RECORDING MEDIUM STORING LEARNING PROGRAM, INFERENCE METHOD, AND LEARNING METHOD

CROSS-REFERENCE TO RELATED APPLICATION

This application is based upon and claims the benefit of priority of the prior Japanese Patent Application No. 2021-174706, filed on Oct. 26, 2021, the entire contents of which are incorporated herein by reference.

FIELD

The embodiments discussed herein are related to an inference program and the like.

BACKGROUND

In stores such as supermarkets and convenience stores, self-checkout machines are becoming popular. The self-checkout machine is a point of sale (POS) checkout system by which a user who purchases a product himself/herself performs from reading of a barcode of the product to payment. For example, by introducing the self-checkout machine, it is possible to suppress labor costs and prevent payment errors by store clerks.

Japanese Laid-open Patent Publication No. 2019-153057 is disclosed as related art.

SUMMARY

According to an aspect of the embodiments, a non-transitory computer-readable recording medium stores an inference program for causing a computer to execute processing including: acquiring a background image in which a target area in which an object is arranged is captured, and a target image in which the object and the area are captured; generating an intermediate feature by inputting the background image and the target image to a feature extraction model; generating a mask image that indicates a region of an object that does not exist in the background image but exists in the target image by inputting the intermediate feature to a generation model; and specifying the object that does not exist in the background image but exists in the target image by inputting the generated mask image and intermediate feature to an estimation model.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram for supplementarily describing the characteristic processing 1;

FIG. 7 is a diagram illustrating one example of a data structure of training data according to the present first embodiment;

FIG. 14 is a diagram illustrating one example of a data structure of training data according to the present second embodiment;

FIG. 23 is a diagram for describing a problem.

DESCRIPTION OF EMBODIMENTS

On the other hand, in the self-checkout machine, it is needed to detect fraud of a user, such as not reading a barcode.

Figure 21:
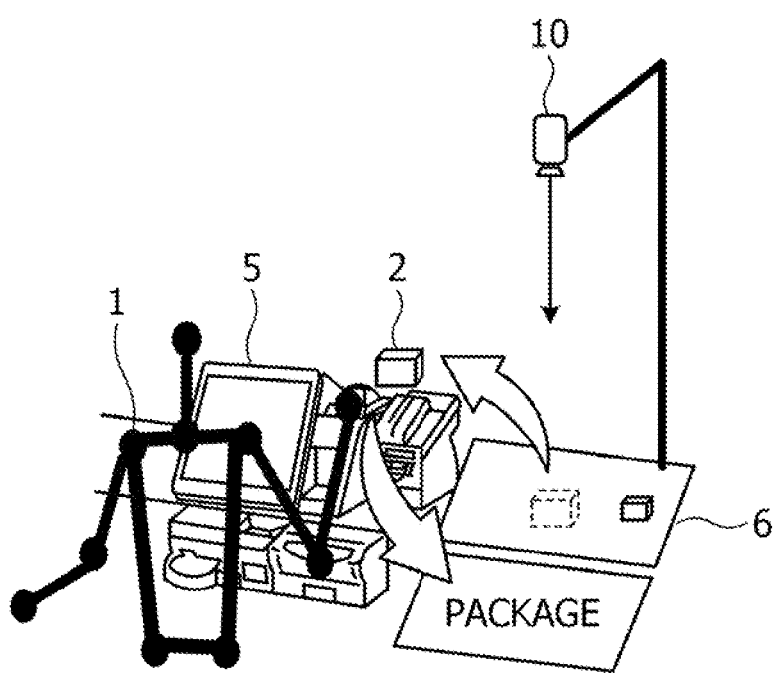
FIG. 21 is a diagram.

In an example illustrated in FIG. 21, it is assumed that a user 1 picks up a product 2 placed on a temporary placement table 6, performs operation to scan a barcode of the product 2 against a self-checkout machine 5, and packages the product 2. Image data of a camera 10 is analyzed, object detection is performed on the product placed on the temporary placement table 6, and the number of products is specified. Fraud may be detected by checking whether or not the specified number of products matches the number of products actually scanned. A technology such as deep learning (hereinafter referred to as DL) is used when performing object detection as described with reference to FIG. 21.

In the case of performing object detection using DL, a large amount of labeled data is manually prepared, and machine learning is executed for an object detection model for performing the object detection by using the labeled data. Here, since the object detection model detects only objects learned in advance, it is not realistic to repeat preparing the labeled data and executing machine learning of the object detection model again under the condition that there are a large number of types of products and the products are replaced every day, such as in the stores described above.

Figure 22:
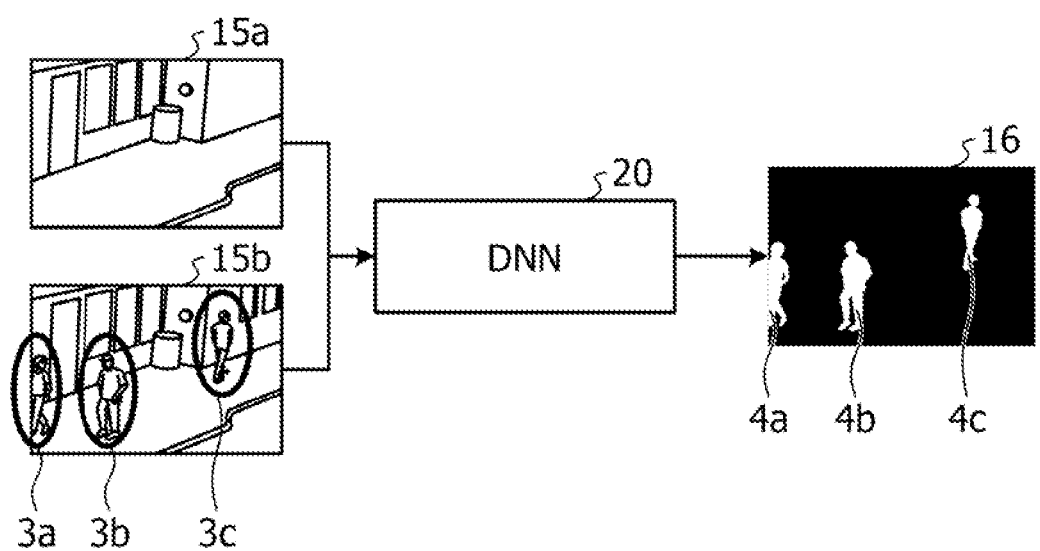
FIG. 22 is a diagram that specifies a region of an unknown object.

Note that there is a case in which, even in the case of an unknown object which has not been previously learned, a region of such an object may be specified. FIG. 22 is a diagram in which a region of an unknown object is specified. With reference to FIG. 22, a deep neural network (DNN) 20 that outputs a mask image 16 indicating a region different from a background from a background image 15a and a target image 15b is acquired by machine learning by using a large number of various images.

Although an image capturing area of the background image 15a and an image capturing area of the target image 15b are the same image capturing area, the background image 15a does not include objects 3a, 3b, and 3c existing in the target image 15b. In the mask image 16, regions 4a, 4b, and 4c corresponding to the objects 3a, 3b, and 3c are indicated. For example, "1" is set for pixels in the regions 4a, 4b, and 4c of the mask image 16, and "0" is set for pixels in another region.

In FIG. 22, since a region different from a background is specified, the region may be specified even in the case of an unknown object. Thus, it is conceivable to specify a region of an unknown product and specify the number of products by applying FIG. 22 to FIG. 21.

However, there is a problem that it is not possible to detect an object that does not exist in a background image but exists in a target image.

With reference to FIG. 22 is a technology that specifies an entire region different from a background, and does not specify a position, size, or the like of each object. Thus, in a case where a plurality of objects is close to each other, the objects become one connected area.

FIG. 23 is a diagram for describing the problem. In an example illustrated in FIG. 23, when a background image 17a and a target image 17b are input to the machine-learned DNN 20, a mask image 18 is output. The target image 17b includes products 7a, 7b, and 7c. Since the products 7a to 7c in the target image 17b are close to each other, a region 8 of one connected area is indicated in the mask image 18. It is difficult to specify regions corresponding to the products 7a, 7b, and 7c on the basis of the region 8 in the mask image 18, and to specify the number of products "3".

In one aspect, it is an object of an embodiment to provide an inference program, a learning program, an inference method, and a learning method capable of detecting an object that does not exist in a background image but exists in a target image.

Hereinafter, embodiments of an inference program, a learning program, an inference method, and a learning method disclosed in the present application will be described in detail with reference to the drawings. Note that the present disclosure is not limited by the embodiments.

First Embodiment

Figure 1:
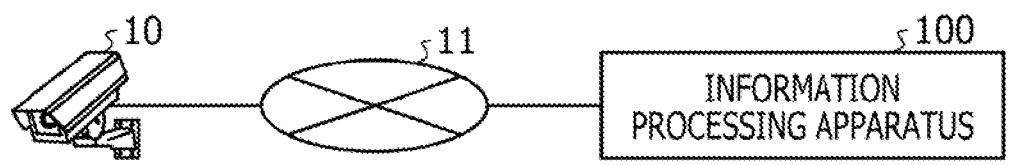
FIG. 1 is a diagram illustrating a system according to a present first embodiment.

One example of a system according to a present first embodiment will be described. FIG. 1 is a diagram illustrating the system according to the present first embodiment. As illustrated in FIG. 1, the system includes a camera 10 and an information processing apparatus 100. The camera 10 and the information processing apparatus 100 are connected to each other via a network 11. The camera 10 and the information processing apparatus 100 may be directly connected in a wired or wireless manner.

The camera 10 may be a camera that captures the inside or outside of a store, or may be a camera that captures the temporary placement table 6 illustrated in FIG. 21, on which a product is placed. The camera 10 transmits image data in an image capturing range to the information processing apparatus 100.

In the following description, image data that is captured by the camera 10 and does not include an object to be detected is referred to as "background image data". For example, the background image data corresponds to the background image 15a described with reference to FIG. 22. Image data that is captured by the camera 10 and includes an object to be detected is referred to as "target image data". For example, the target image data corresponds to the target image 15b described with reference to FIG. 22. The target image 15b includes objects 3a to 3c. Although an image capturing area of the background image 15a is the same as an image capturing area of the target image 15b, the background image 15a does not include the objects 3a to 3c.

The information processing apparatus 100 is an apparatus that infers a region of each object included in target image data on the basis of background image data and the target image data. The information processing apparatus 100 receives background image data from the camera 10 in advance before starting inference, and sequentially receives target image data from the camera 10 when starting inference.

In the following, processing of a basic portion of the information processing apparatus 100 and characteristic processing 1 and 2 added to such processing of the basic portion will be described in order.

Figure 2:
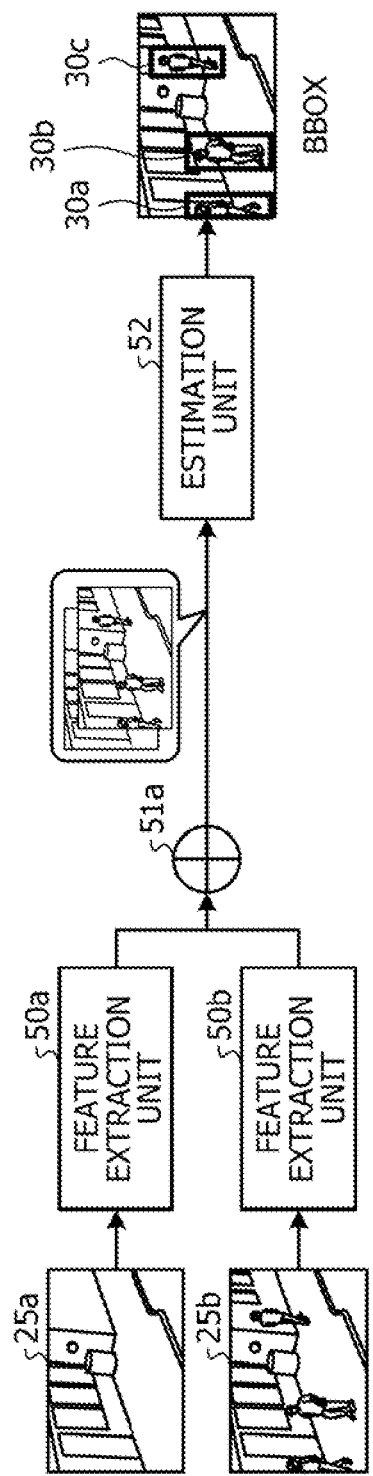
FIG. 2 is a diagram describing processing of a basic portion of an information processing apparatus according to the present first embodiment.

FIG. 2 is a diagram describing the processing of the basic portion of the information processing apparatus according to the present first embodiment. As illustrated in FIG. 2, the information processing apparatus 100 that executes the processing of the basic portion includes feature extraction units 50a and 50b, a combination unit 51a, and an estimation unit 52.

The feature extraction units 50a and 50b correspond to a general convolutional neural network (CNN). When background image data 25a is input, the feature extraction unit 50a outputs an image feature to the combination unit 51a on the basis of parameters trained by machine learning. When target image data 25b is input, the feature extraction unit 50b outputs an image feature to the combination unit 51a on the basis of parameters trained by machine learning.

It is assumed that the image features output from the feature extraction units 50a and 50b are values before being converted into probability values based on a softmax function or the like. In the following description, the image feature of the background image data 25a is referred to as "background image feature". The image feature of the target image data 25b is referred to as "target image feature". The background image feature and the target image feature correspond to intermediate features.

The same parameters are set in the feature extraction units 50a and 50b. In FIG. 2, for convenience of description, the feature extraction units 50a and 50b are illustrated separately, but it is assumed that the feature extraction units 50a and 50b are the same CNN.

The combination unit 51a combines a background image feature and a target image feature, and outputs a feature obtained by the combination to the estimation unit 52.

The estimation unit 52 corresponds to a general convolutional neural network (CNN). When a feature obtained by combining a background image feature and a target image feature is input, the estimation unit 52 specifies a bounding box (BBOX) of each object on the basis of parameters trained by machine learning. For example, the BBOX is region information surrounding an object, and has information regarding a position and size. In an example illustrated in FIG. 2, three BBOXes 30a, 30b, and 30c are specified.

Figure 3:
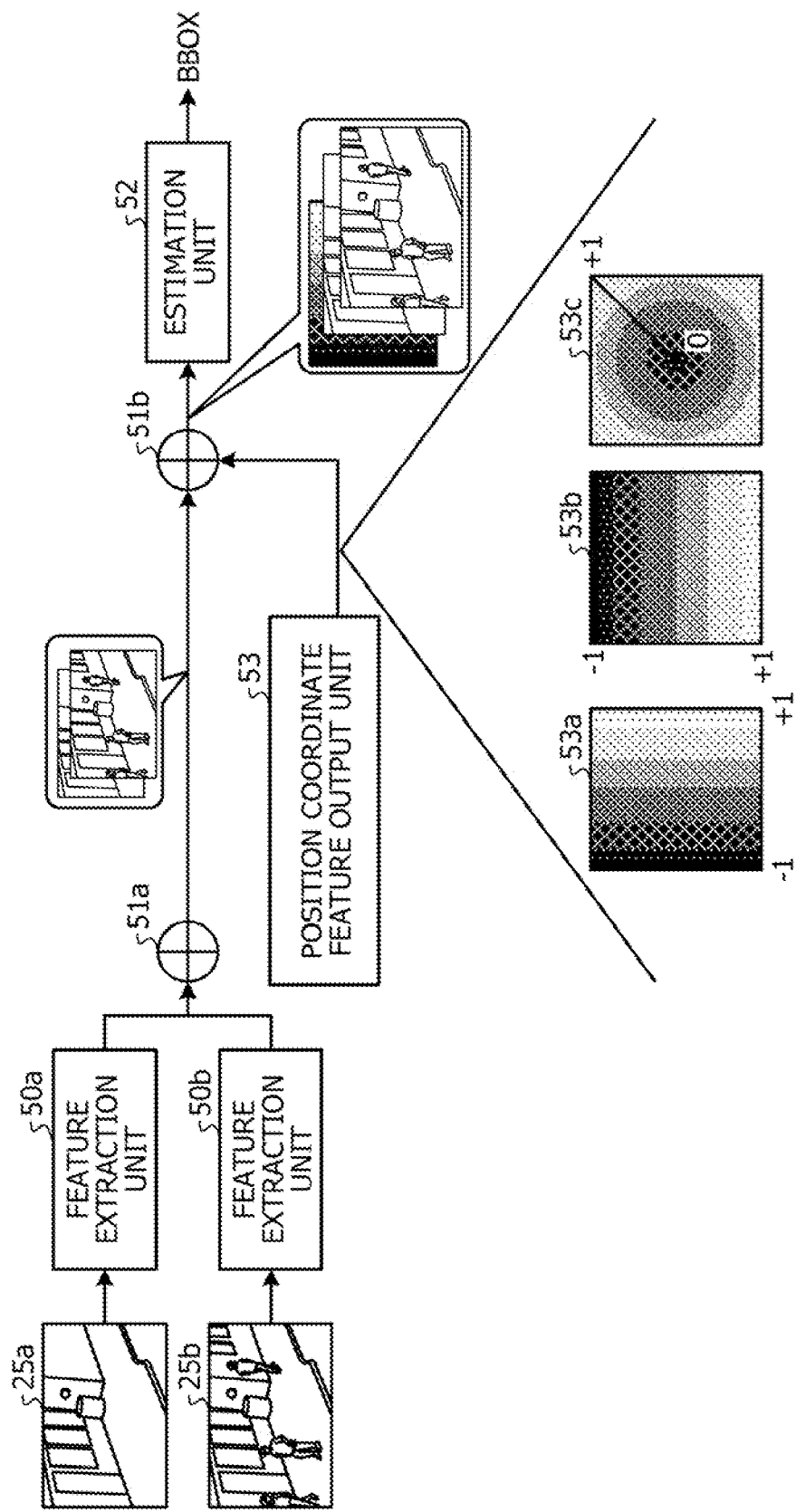
FIG. 3 is a diagram for describing characteristic processing 1.

Subsequently, the "characteristic processing 1" added to the processing of the basic portion of the information processing apparatus 100 illustrated in FIG. 2 will be described. FIG. 3 is a diagram for describing the characteristic processing 1. In FIG. 3, in addition to the feature extraction units 50a and 50b, the combination unit 51a, and the estimation unit 52 described with reference to FIG. 2, a position coordinate feature output unit 53 and a combination unit 51b are included.

Description regarding the feature extraction units 50a and 50b is similar to the description of the feature extraction units 50a and 50b described with reference to FIG. 2.

The combination unit 51a combines a background image feature and a target image feature, and outputs a feature obtained by the combination to the combination unit 51b.

The position coordinate feature output unit 53 outputs a plurality of coordinate features in which coordinate values are arranged in an image plane. For example, as illustrated in FIG. 3, the position coordinate feature output unit 53 outputs an x-coordinate feature 53a, a y-coordinate feature 53b, and a distance feature 53c to the combination unit 51b.

For pixels of the x-coordinate feature 53a, coordinate values from "−1" to "+1" are set in ascending order in a row direction from left to right. For pixels in a column direction, the same coordinate value is set. For example, for pixels in the leftmost column of the x-coordinate feature 53a, "−1" is set.

For pixels of the y-coordinate feature 53b, coordinate values from "−1" to "+1" are set in ascending order in a column direction from top to bottom. For pixels in a row direction, the same coordinate value is set. For example, for pixels in the uppermost column of the y-coordinate feature 53b, "−1" is set.

For the distance feature 53c, coordinate values from "0" to "+1" are set in an outward direction from a central pixel in ascending order. For example, for the central pixel of the distance feature 53c, "0" is set.

The combination unit 51b outputs, to the estimation unit 52, information obtained by combining a background image feature, a target image feature, the x-coordinate feature 53a, the y-coordinate feature 53b, and the distance feature 53c.

The estimation unit 52 specifies, when information obtained by combining a background image feature, a target image feature, the x-coordinate feature 53a, the y-coordinate feature 53b, and the distance feature 53c is input, a BBOX of each object on the basis of parameters trained by machine learning.

FIG. 4 is a diagram for supplementarily describing the characteristic processing 1. For example, a case is assumed where convolution by a neural network is performed for an image 21 illustrated in FIG. 4. In normal convolution processing, it is difficult to discriminate objects having the same appearance as separate objects because positions do not change. For example, objects 22 and 23 included in the image 21 have the same appearance. Thus, a result 22b obtained by performing the convolution processing on a region 22a and a result 23b obtained by performing the convolution processing on a region 23a become the same.

On the other hand, in the characteristic processing 1 described with reference to FIG. 3, convolution is executed for the information obtained by combining the image feature with the x-coordinate feature 53a, the y-coordinate feature 53b, and the distance feature 53c. For example, in a case where convolution is executed for the region 22a, convolution is performed also for a region 53a-1, a region 53b-1, and a region 53c-1. Similarly, in a case where convolution is executed for the region 23a, convolution is performed also for a region 53a-2, a region 53b-2, and a region 53c-2. With this configuration, the result 22b obtained by performing the convolution processing on the region 22a and the result 23b obtained by performing the convolution processing on the region 23a do not become the same, and it is possible to discriminate the objects 22 and 23.

Figure 5:
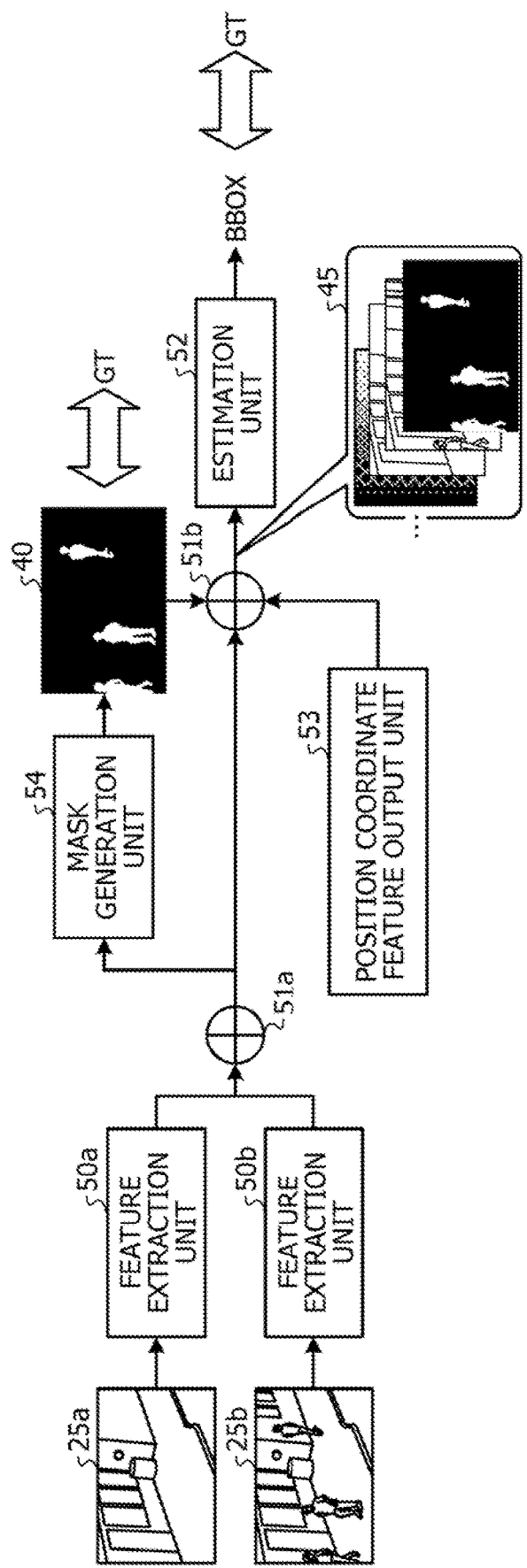
FIG. 5 is a diagram for describing characteristic processing 2.

Subsequently, the "characteristic processing 2" added to the processing of the basic portion of the information processing apparatus 100 illustrated in FIG. 2 will be described. FIG. 5 is a diagram for describing the characteristic processing 2. In FIG. 5, in addition to the feature extraction units 50a and 50b, the combination units 51a and 51b, the estimation unit 52, and the position coordinate feature output unit 53 described with reference to FIG. 3, a mask generation unit 54 is included.

Description regarding the feature extraction units 50a and 50b and the position coordinate feature output unit 53 is similar to the description given with reference to FIGS. 2 and 3.

The combination unit 51a combines a background image feature and a target image feature, and outputs a feature obtained by the combination to the combination unit 51b and the mask generation unit 54.

The mask generation unit 54 corresponds to a general convolutional neural network (CNN). The mask generation unit 54 generates, when a feature obtained by combining a background image feature and a target image feature is input, a mask image 40 on the basis of parameters trained by machine learning. The mask image 40 is information indicating a region of an object that does not exist in the background image data 25a but exists in the target image data 25b. For example, the mask image 40 is a bitmap, and "1" is set for pixels corresponding to a region of an object, and "0" is set for pixels corresponding to another region.

The combination unit 51b outputs, to the estimation unit 52, combination information 45 obtained by combining a background image feature, a target image feature, the x-coordinate feature 53a, the y-coordinate feature 53b, the distance feature 53c, and the mask image 40.

The estimation unit 52 specifies, when the combination information 45 is input, a BBOX of each object on the basis of parameters trained by machine learning. For example, the combination information 45 is information in which a background image feature, a target image feature, the x-coordinate feature 53a, the y-coordinate feature 53b, the distance feature 53c, and the mask image 40 overlap. The estimation unit 52 arranges a kernel in which parameters are set in the combination information 45 in which each information is overlapped, and performs convolution while moving a position of the kernel.

Here, supplementary description will be given regarding the characteristic processing 2. For example, when machine learning is assumed in a case where the mask generation unit 54 is not used, the machine learning is performed by using training data in which background image data for learning and target image data for learning are used as input data and a BBOX of an object included in the target image data for learning is used as correct answer data (ground truth (GT)).

When such machine learning is performed, there may be a case where features of each object included in the target image data is memorized, and a BBOX of an object is estimated only from the target image data without using the background image data. For example, the objects included in the target image data for learning are memorized as they are, and it is not possible to deal with an unknown object, which may be said to be overfitting (overlearning).

In order to suppress the overfitting described above, a neural network (NN) is made to utilize a background image by machine learning a task that may not be solved without also using background image data as an auxiliary task. For example, the processing of machine learning the mask generation unit 54 illustrated in FIG. 5 is an auxiliary task. For example, the estimation of a BBOX described above is a main task, and the task of generating a mask image is an auxiliary task.

Furthermore, the mask image 40 generated by the mask generation unit 54 is further input to the estimation unit 52 to execute machine learning for estimating a BBOX of an object. With this configuration, an effect of limiting an object to be detected to a region of the object in a mask image may be expected.

In FIG. 5, the information processing apparatus 100 inputs input data to the feature extraction units 50a and 50b, and trains parameters of the feature extraction units 50a and 50b, the estimation unit 52, and the mask generation unit 54 so that an error between a BBOX output by the estimation unit 52 and correct answer data (correct answer value of the BBOX) and an error between a mask image output from the mask generation unit 54 and correct answer data (correct answer value of the mask image) become small.

Figure 6:
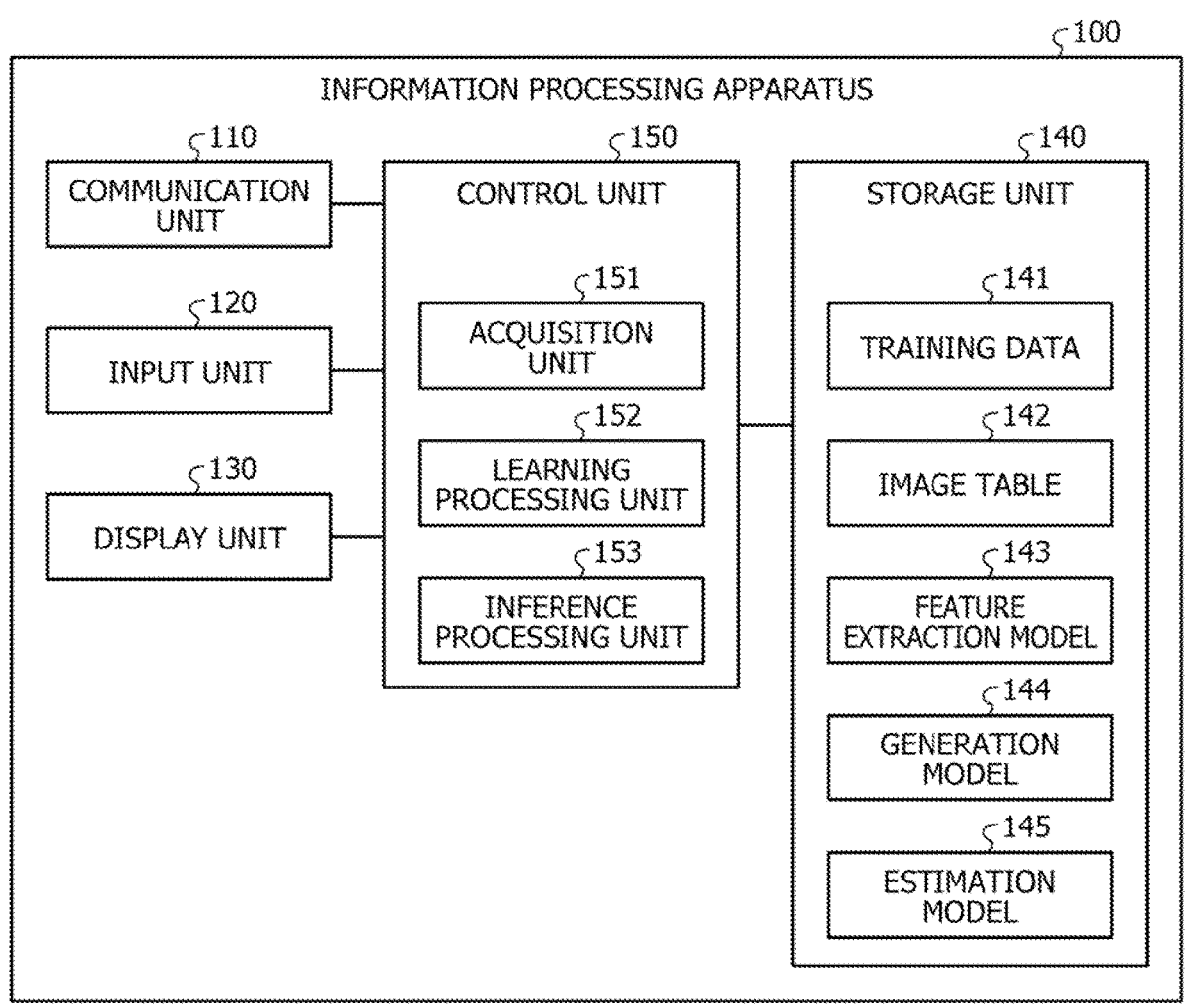
FIG. 6 is a functional block diagram illustrating a configuration of the information processing apparatus according to the present first embodiment.

Next, one example of a configuration of the information processing apparatus 100 that executes the processing described with reference to FIGS. 2 to 4 will be described. FIG. 6 is a functional block diagram illustrating the configuration of the information processing apparatus according to the present first embodiment. As illustrated in FIG. 6, the information processing apparatus 100 includes a communication unit 110, an input unit 120, a display unit 130, a storage unit 140, and a control unit 150.

The communication unit 110 executes data communication with the camera 10 and an external device (not illustrated). For example, the communication unit 110 receives image data (background image data, target image data) from the camera 10. The communication unit 110 receives training data 141 or the like used for machine learning from an external device.

The input unit 120 corresponds to an input device for inputting various types of information to the information processing apparatus 100.

The display unit 130 displays an output result from the control unit 150.

The storage unit 140 includes the training data 141, an image table 142, a feature extraction model 143, a generation model 144, and an estimation model 145. The storage unit 140 corresponds to a semiconductor memory element such as a random access memory (RAM) or a flash memory, or a storage device such as a hard disk drive (HDD).

The training data 141 is data used in a case where machine learning is executed. FIG. 7 is a diagram illustrating one example of a data structure of the training data according to the present first embodiment. As illustrated in FIG. 7, the training data 141 holds an item number, input data, and correct answer data (GT) in association with each other. The input data includes background image data for learning and target image data for learning. The correct answer data includes GT of a mask image and GT of a BBOX (coordinates of a region of an object).

The image table 142 is a table that holds background image data and target image data used at the time of inference.

The feature extraction model 143 is a machine learning model (CNN) executed by the feature extraction units 50a and 50b. When image data is input to the feature extraction model 143, an image feature is output.

The generation model 144 is a machine learning model (CNN) executed by the mask generation unit 54. When information obtained by combining a background image feature and a target image feature is input to the generation model 144, a mask image is output.

The estimation model 145 is a machine learning model (CNN) executed by the estimation unit 52. When the combination information 45 is input to the estimation model 145, a BBOX is output.

The control unit 150 includes an acquisition unit 151, a learning processing unit 152, and an inference processing unit 153. The control unit 150 corresponds to a central processing unit (CPU) or the like.

The acquisition unit 151 registers, in the case of acquiring the training data 141 from an external device or the like, the acquired training data 141 in the storage unit 140.

The acquisition unit 151 previously acquires background image data from the camera 10, and registers the background image data in the image table 142. The acquisition unit 151 acquires target image data from the camera 10, and registers the target image data in the image table 142.

The learning processing unit 152 executes machine learning of the feature extraction units 50a and 50b (feature extraction model 143), the mask generation unit 54 (generation model 144), and the estimation unit 52 (estimation model 145) on the basis of the training data 141.

Figure 8:
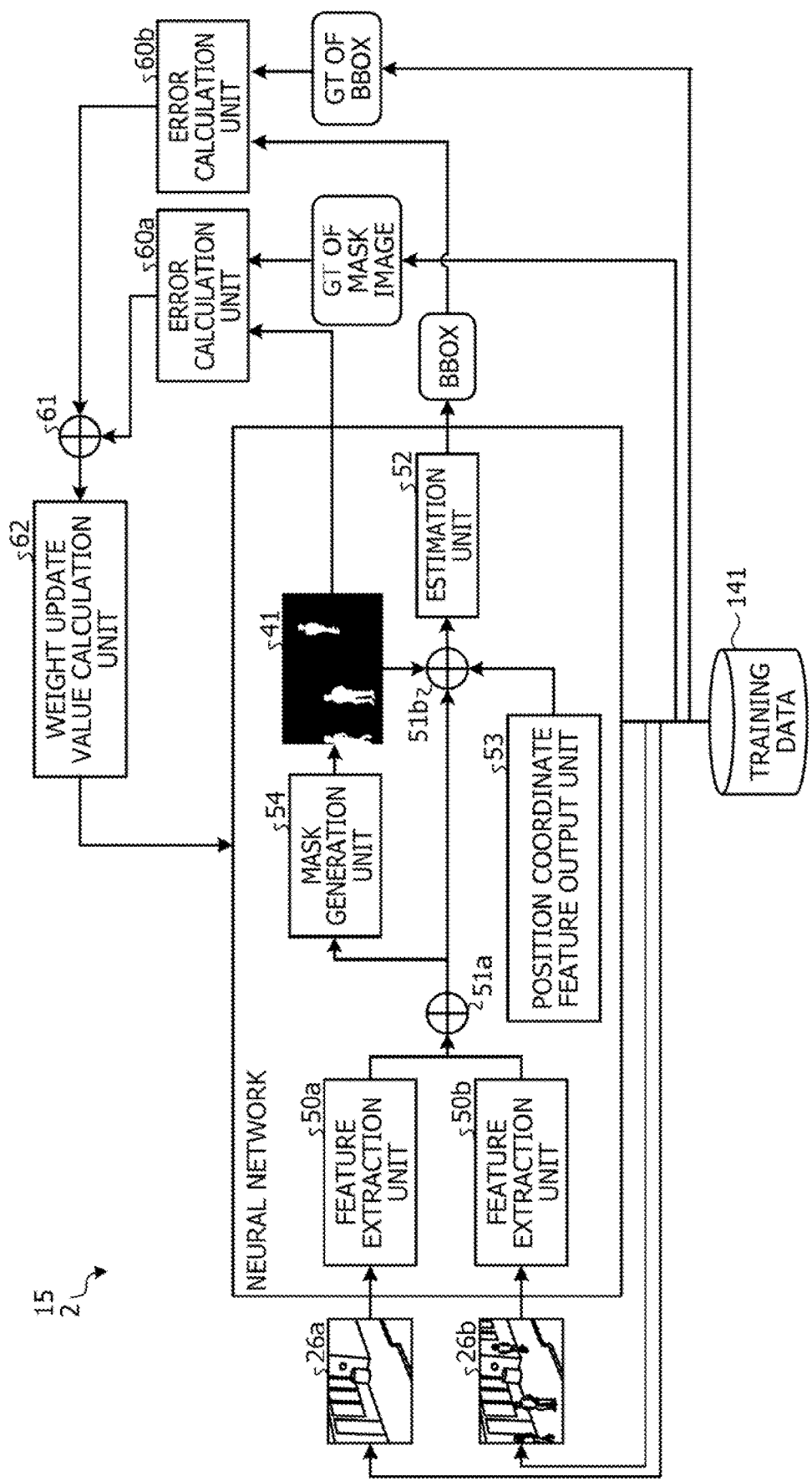
FIG. 8 is a diagram for describing processing of a learning processing unit according to the present first embodiment.

FIG. 8 is a diagram for describing processing of the learning processing unit according to the present first embodiment. For example, the learning processing unit 152 includes the feature extraction units 50a and 50b, the combination units 51a and 51b, the estimation unit 52, the mask generation unit 54, and the position coordinate feature output unit 53. Furthermore, the learning processing unit 152 includes error calculation units 60a and 60b, a combination unit 61, and a weight update value calculation unit 62. In the following description, the feature extraction units 50a and 50b, the estimation unit 52, the position coordinate feature output unit 53, and the mask generation unit 54 are collectively referred to as a "neural network" as appropriate.

The processing of the feature extraction units 50a and 50b is similar to that in the description given in FIG. 5. For example, the feature extraction units 50a and 50b read and execute the feature extraction model 143. The feature extraction units 50a and 50b input image data to the feature extraction model 143, and calculate an image feature on the basis of parameters of the feature extraction model 143.

The description of the combination units 51a and 51b is similar to the description given in FIG. 5.

The processing of the position coordinate feature output unit 53 is similar to that in the description given in FIG. 3.

The processing of the mask generation unit 54 is similar to that in the description given in FIG. 5. For example, the mask generation unit 54 reads and executes the generation model 144. The mask generation unit 54 inputs a feature obtained by combining a background image feature and a target image feature to the generation model 144, and generates a mask image on the basis of parameters of the generation model 144. The mask generation unit 54 outputs the mask image to the combination unit 51b and the error calculation unit 60a.

The processing of the estimation unit 52 is similar to that in the description given in FIG. 5. For example, the estimation unit 52 reads and executes the estimation model 145. The estimation unit 52 reads and executes the estimation model 145. The estimation unit 52 inputs combination information to the estimation model 145, and specifies a BBOX of each object on the basis of parameters of the estimation model 145. The estimation model 145 outputs the BBOX to the error calculation unit 60b.

The learning processing unit 152 acquires background image data 26a for learning from the training data 141, and inputs the background image data 26a for learning to the feature extraction unit 50a. The learning processing unit 152 acquires target image data 26b for learning from the training data 141, and inputs the target image data 26b for learning to the feature extraction unit 50b. Furthermore, the learning processing unit 152 acquires GT of a mask image from the training data 141, and inputs the GT of the mask image to the error calculation unit 60a. The learning processing unit 152 acquires GT of a BBOX from the training data 141, and inputs the GT of the BBOX to the error calculation unit 60b.

The error calculation unit 60a calculates an error between a mask image 41 output from the mask generation unit 54 and GT of a mask image of the training data 141. In the following description, the error between the mask image 41 and the GT of the mask image is referred to as a "first error". The error calculation unit 60a outputs the first error to the combination unit 61.

The error calculation unit 60b calculates an error between a BBOX output from the estimation unit 52 and GT of a BBOX of the training data 141. In the following description, the error between the BBOX output from the estimation unit 52 and the GT of the BBOX of the training data 141 is referred to as a "second error". The error calculation unit 60b outputs the second error to the combination unit 61.

The combination unit 61 calculates the sum of a first error and a second error. In the following description, the sum of the first error and the second error is referred to as a "total error". The combination unit 61 output the total error to the weight update value calculation unit 62.

The weight update value calculation unit 62 updates parameters (weights) of the neural network so that a total error becomes small. For example, the weight update value calculation unit 62 updates parameters of the feature extraction units 50a and 50b (feature extraction model 143), the mask generation unit 54 (generation model 144), and the estimation unit 52 (estimation model 145) by using an error back propagation method or the like.

The learning processing unit 152 repeatedly executes the processing described above by using each piece of input data and correct answer data stored in the training data 141. The learning processing unit 152 registers the machine-learned feature extraction model 143, generation model 144, and estimation model 145 in the storage unit 140.

The description returns to FIG. 6. The inference processing unit 153 specifies a region of an object that does not exist in background image data but exists in target image data by using the machine-learned feature extraction units 50a and 50b (feature extraction model 143), mask generation unit 54 (generation model 144), and estimation unit 52 (estimation model 145).

Figure 9:
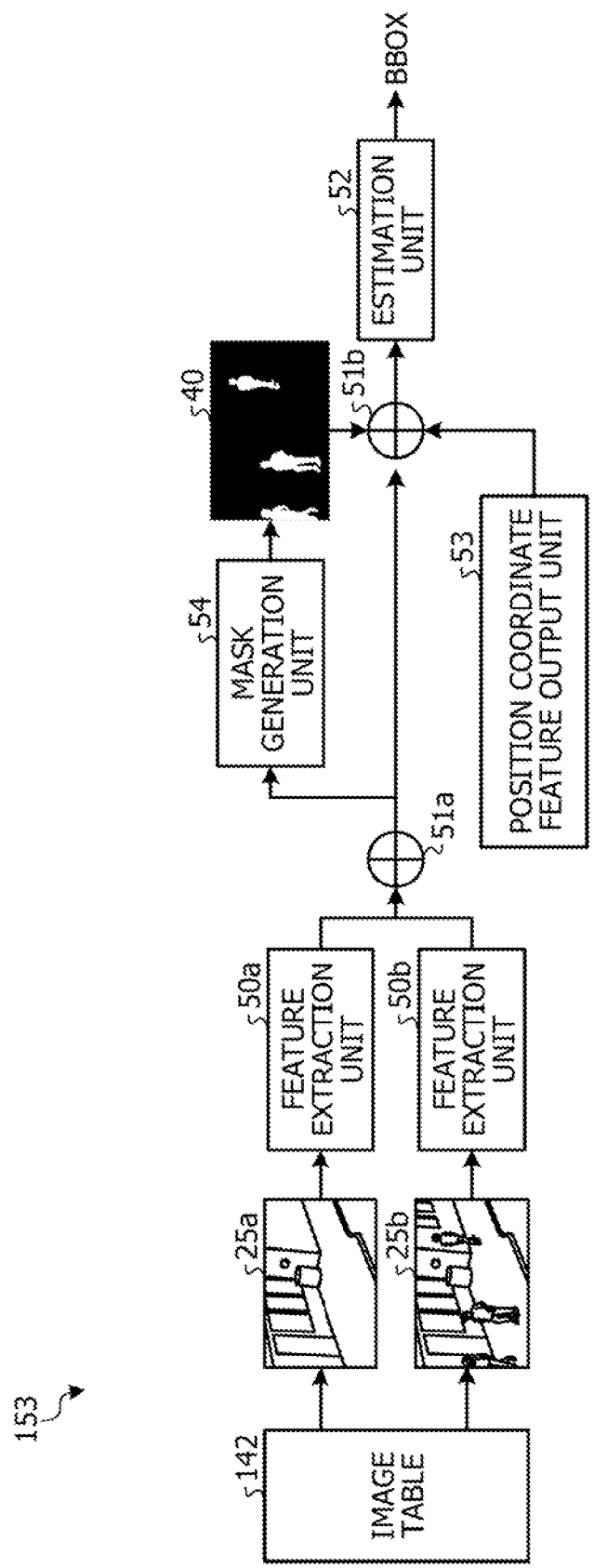
FIG. 9 is a diagram for describing processing of an inference processing unit according to the present first embodiment.

FIG. 9 is a diagram for describing processing of the inference processing unit according to the present first embodiment. For example, the inference processing unit 153 includes the feature extraction units 50a and 50b, the combination units 51a and 51b, the estimation unit 52, the mask generation unit 54, and the position coordinate feature output unit 53.

The processing of the feature extraction units 50a and 50b is similar to that in the description given in FIG. 5. For example, the feature extraction units 50a and 50b read and execute the machine-learned feature extraction model 143. The feature extraction units 50a and 50b input image data to the feature extraction model 143, and calculate an image feature on the basis of parameters of the feature extraction model 143.

The description of the combination units 51a and 51b is similar to the description given in FIG. 5.

The processing of the position coordinate feature output unit 53 is similar to that in the description given in FIG. 3.

The processing of the mask generation unit 54 is similar to that in the description given in FIG. 5. For example, the mask generation unit 54 reads out and executes the machine-learned generation model 144. The mask generation unit 54 inputs a feature obtained by combining a background image feature and a target image feature to the generation model 144, and generates a mask image on the basis of parameters of the generation model 144. The mask generation unit 54 outputs the mask image to the combination unit 51b.

The processing of the estimation unit 52 is similar to that in the description given in FIG. 5. For example, the estimation unit 52 reads and executes the trained estimation model 145. The estimation unit 52 reads and executes the estimation model 145. The estimation unit 52 inputs the combination information 45 to the estimation model 145, and specifies a BBOX of each object on the basis of parameters of the estimation model 145.

The inference processing unit 153 acquires the background image data 25a from the image table 142, and inputs the background image data 25a to the feature extraction unit 50a. The inference processing unit 153 acquires the target image data 25b from the image table 142, and inputs the target image data 25b to the feature extraction unit 50b. The inference processing unit 153 may output information regarding a BBOX specified by the estimation unit 52 to the display unit 130 or to an external device.

Next, one example of a processing procedure of the information processing apparatus 100 according to the present first embodiment will be described. In the following, a processing procedure of learning processing and a processing procedure of inference processing executed by the information processing apparatus 100 will be described in order.

Figure 10:
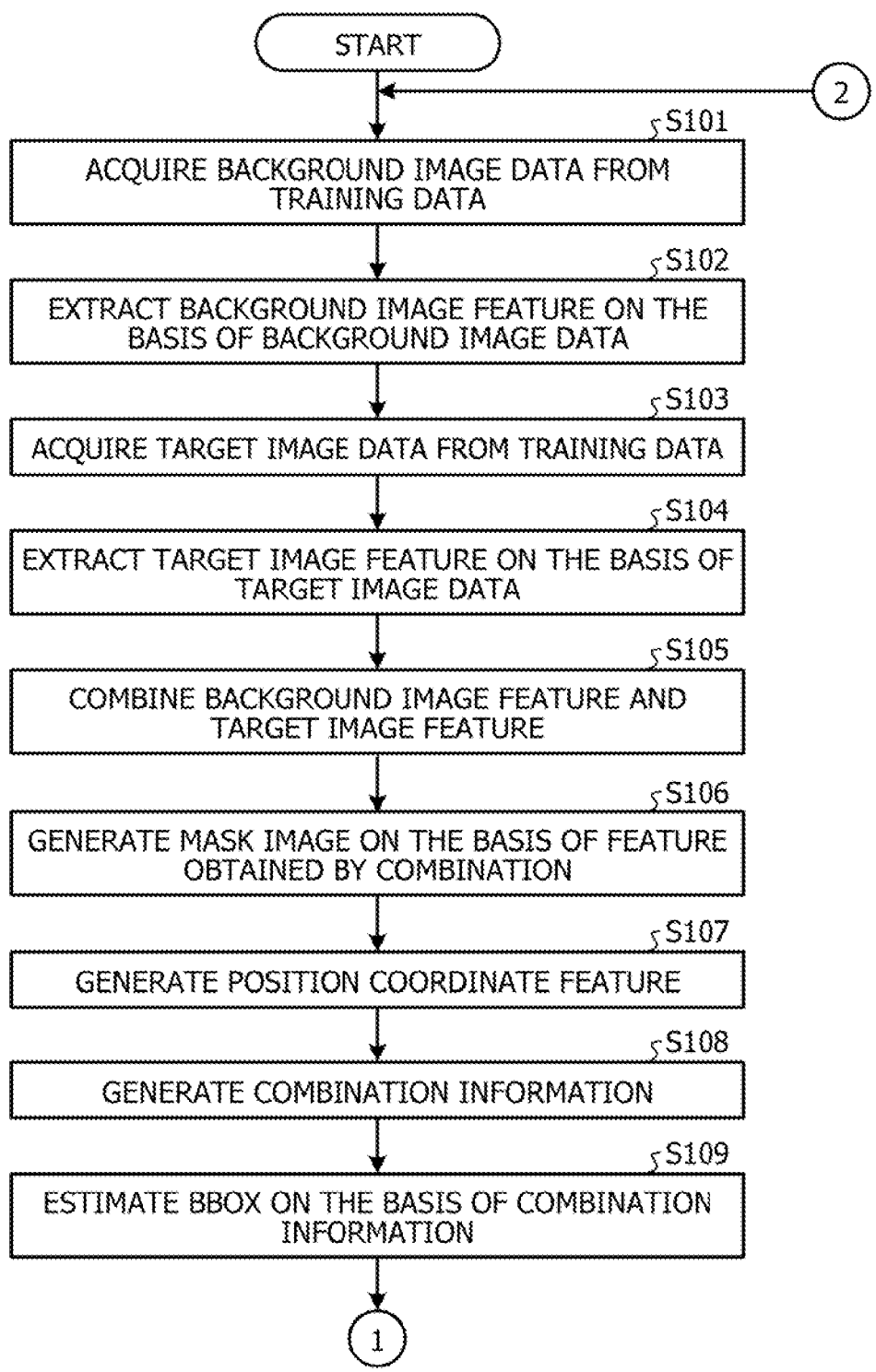
FIG. 10 is a flowchart (1) illustrating a processing procedure of learning processing according to the present first embodiment.
Figure 11:
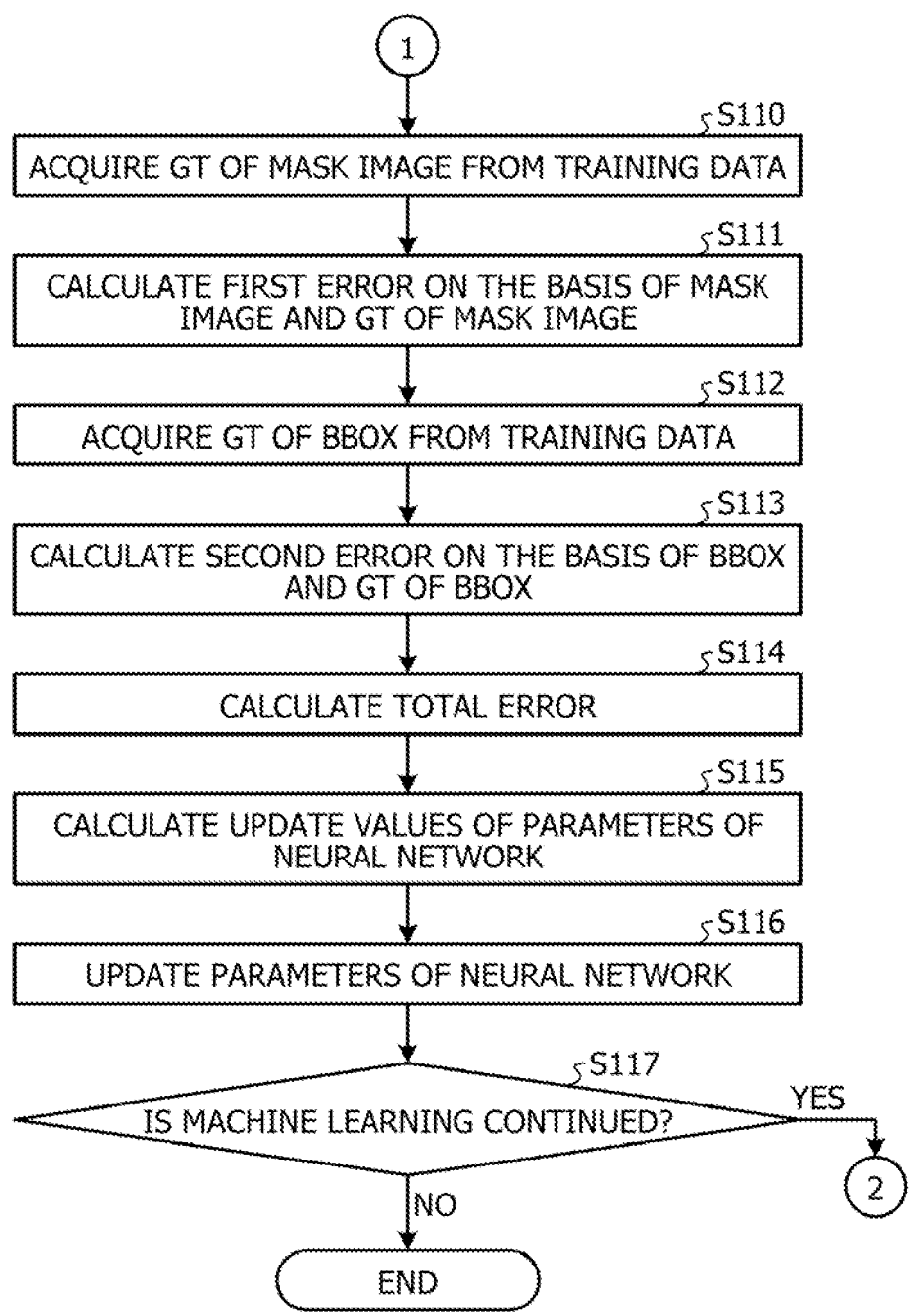
FIG. 11 is a flowchart (2) illustrating the processing procedure of the learning processing according to the present first embodiment.

The processing procedure of the learning processing will be described. FIGS. 10 and 11 are flowcharts illustrating the processing procedure of the learning processing according to the present first embodiment. As illustrated in FIG. 10, the learning processing unit 152 of the information processing apparatus 100 acquires background image data from the training data 141 (Step S101). The feature extraction unit 50a of the learning processing unit 152 extracts a background image feature on the basis of the background image data (Step S102).

The learning processing unit 152 acquires target image data from the training data 141 (Step S103). The feature extraction unit 50b of the learning processing unit 152 extracts a target image feature on the basis of the target image data (Step S104).

The combination unit 51a of the learning processing unit 152 combines the background image feature and the target image feature (Step S105). The mask generation unit 54 of the learning processing unit 152 generates a mask image on the basis of a feature obtained by the combination (Step S106).

The position coordinate feature output unit 53 of the learning processing unit 152 generates a position coordinate feature (Step S107). The combination unit 51b of the learning processing unit 152 generates combination information obtained by combining each feature (Step S108).

The estimation unit 52 of the learning processing unit 152 estimates a BBOX on the basis of the combination information (Step S109). The learning processing unit 152 proceeds to Step S110 in FIG. 11.

The description proceeds to FIG. 11. The learning processing unit 152 acquires GT of a mask image from the training data 141 (Step S110). The error calculation unit 60a of the learning processing unit 152 calculates a first error on the basis of the mask image and the GT of the mask image (Step S111).

The learning processing unit 152 acquires GT of a BBOX from the training data 141 (Step S112). The error calculation unit 60b calculates a second error on the basis of the BBOX and the GT of the BBOX (Step S113).

The combination unit 61 of the learning processing unit 152 calculates a total error of the first error and the second error (Step S114). The weight update value calculation unit 62 of the learning processing unit 152 calculates update values of parameters of the neural network (Step S115). The learning processing unit 152 updates the parameters of the neural network (Step S116).

In a case where machine learning is continued (Step S117, Yes), the learning processing unit 152 proceeds to Step S101 in FIG. 10. In a case where the machine learning is not continued (Step S117, No), the machine learning of the neural network is terminated.

Figure 12:
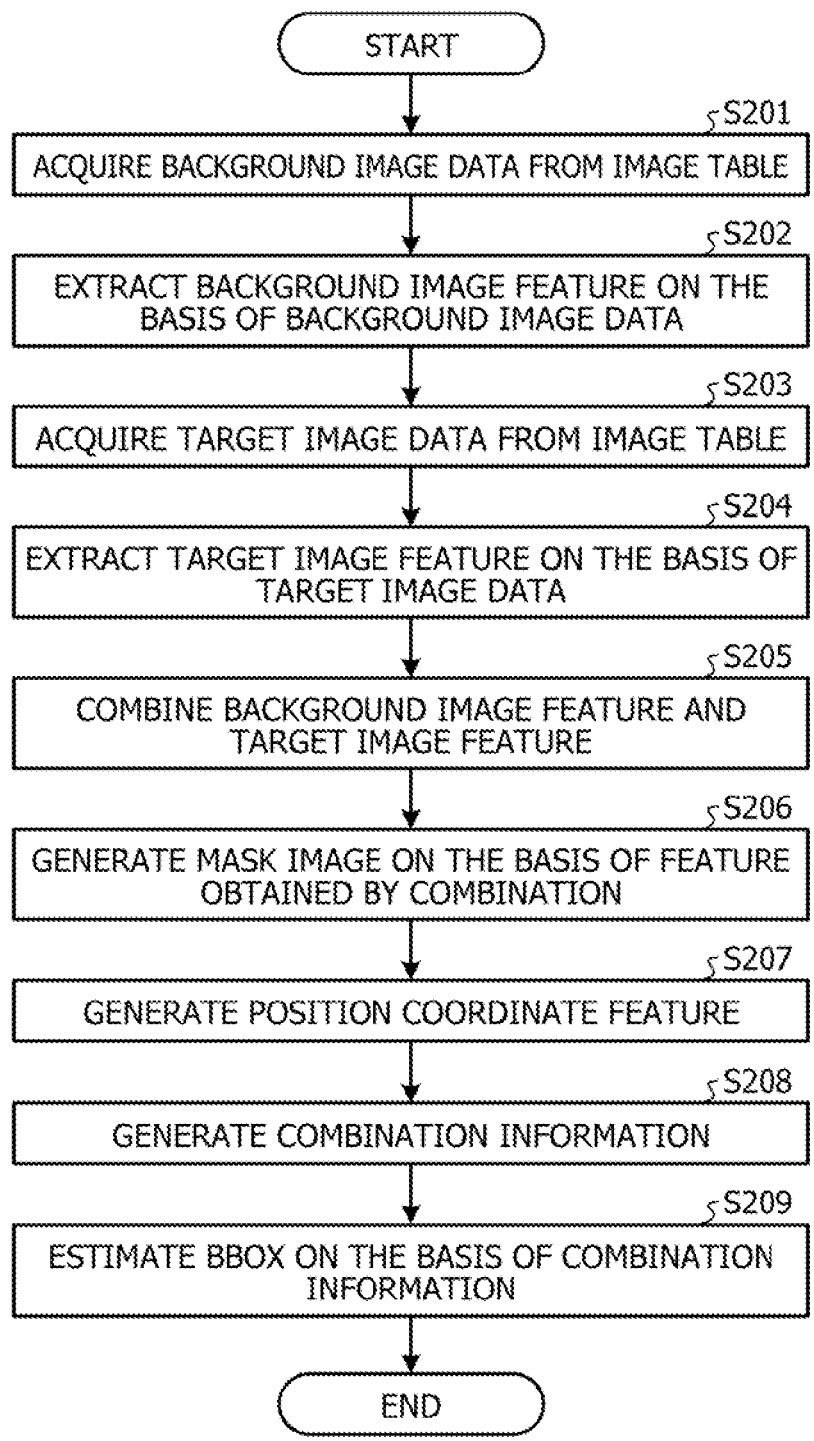
FIG. 12 is a flowchart illustrating a processing procedure of inference processing according to the present first embodiment.

Subsequently, the processing procedure of the inference processing will be described. FIG. 12 is a flowchart illustrating the processing procedure of the inference processing according to the present first embodiment. As illustrated in FIG. 12, the inference processing unit 153 of the information processing apparatus 100 acquires background image data from the image table 142 (Step S201). The feature extraction unit 50a of the inference processing unit 153 extracts a background image feature on the basis of the background image data (Step S202).

The inference processing unit 153 acquires target image data from the image table 142 (Step S203). The feature extraction unit 50b of the inference processing unit 153 extracts a target image feature on the basis of the target image data (Step S204).

The combination unit 51a of the inference processing unit 153 combines the background image feature and the target image feature (Step S205). The mask generation unit 54 of the inference processing unit 153 generates a mask image on the basis of a feature obtained by the combination (Step S206).

The position coordinate feature output unit 53 of the inference processing unit 153 generates a position coordinate feature (Step S207). The combination unit 51b of the inference processing unit 153 generates combination information obtained by combining each feature (Step S208).

The estimation unit 52 of the inference processing unit 153 estimates a BBOX on the basis of the combination information (Step S209).

Next, effects of the information processing apparatus 100 according to the present first embodiment will be described. The information processing apparatus 100 extracts a background image feature and a target image feature by inputting background image data to the feature extraction unit 50a and inputting target image data to the feature extraction unit 50b. The information processing apparatus 100 inputs a feature obtained by combining the background image feature and the target image feature to the mask generation unit 54 to generate a mask image. The information processing apparatus 100 specifies a region of an object by inputting information obtained by combining the mask image and each feature to the estimation unit 52. With this configuration, even when an object included in the target image data is an unknown object that has not been learned previously, each object may be discriminated and detected.

The information processing apparatus 100 inputs information obtained by combining the background image feature, the target image feature, the mask image, and a coordinate feature to the estimation unit 52 to specify a region of an object. With this configuration, even in a case where objects having the same appearance are included in the target image data, convolution processing may be executed so that the respective objects may be distinguished from each other.

The information processing apparatus 100 executes machine learning of the feature extraction units 50a and 50b, the mask generation unit 54, and the estimation unit 52 on the basis of the training data 141. With this configuration, it is possible to perform machine learning of the neural network that may discriminate and detect each object even when an object included in the target image data is an unknown object that has not been learned previously.

The information processing apparatus 100 inputs information obtained by further combining the coordinate feature in addition to each feature to the estimation unit 52 to execute machine learning. With this configuration, even in a case where objects having the same appearance are included in the target image data, the respective objects may be distinguished from each other and machine learning of the neural network may be performed.

The information processing apparatus 100 inputs information obtained by further combining the mask image in addition to each feature to the estimation unit 52 to execute machine learning. With this configuration, an effect of limiting an object to be detected to a region of the object in the mask image may be expected.

Second Embodiment

A configuration of a system according to a second embodiment is similar to the system described in the first embodiment. It is assumed that an information processing apparatus according to the present second embodiment is connected to a camera 10 via a network 11 as in the first embodiment.

The information processing apparatus according to the present second embodiment performs machine learning for feature extraction units 50a and 50b and an estimation unit 52, which are the basic portion described with reference to FIG. 2. The information processing apparatus specifies each object by using the machine-learned feature extraction units 50a and 50b and estimation unit 52.

Figure 13:
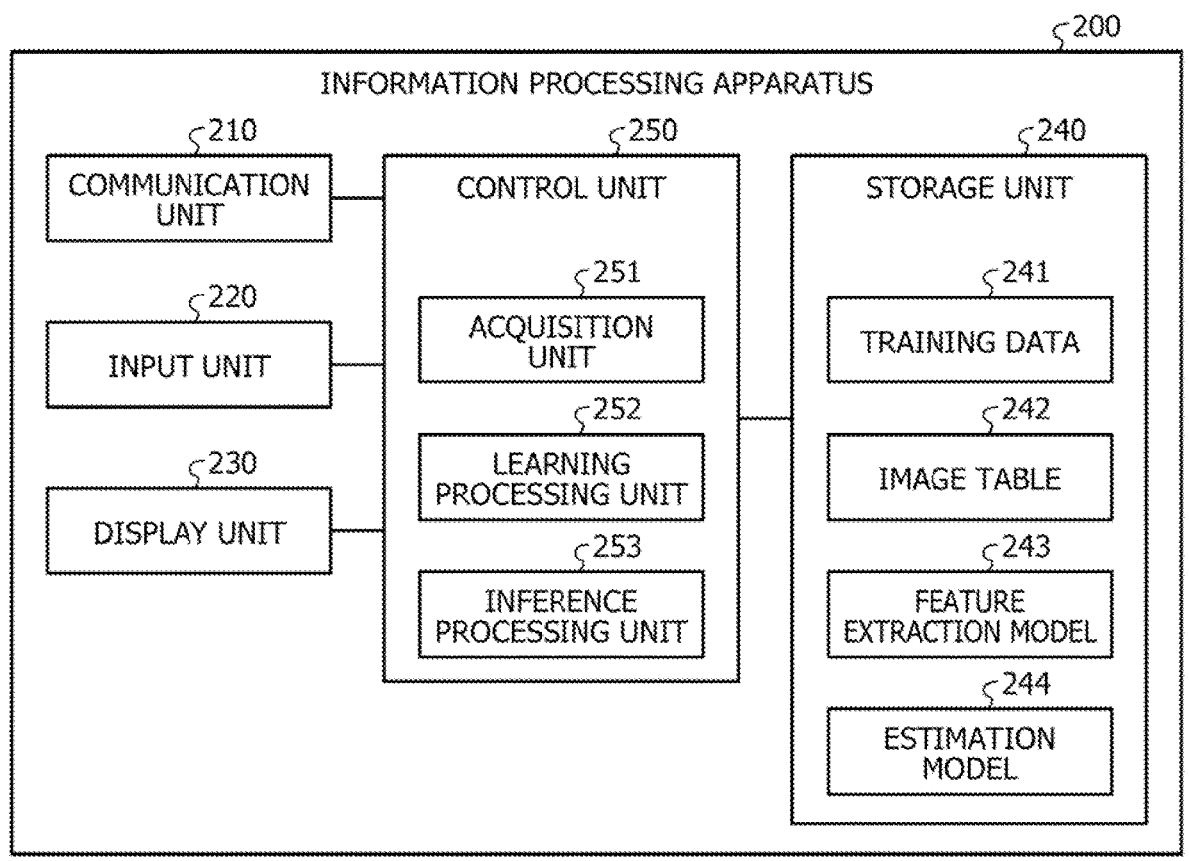
FIG. 13 is a functional block diagram illustrating a configuration of an information processing apparatus according to a present second embodiment.

FIG. 13 is a functional block diagram illustrating a configuration of the information processing apparatus according to the present second embodiment. As illustrated in FIG. 13, an information processing apparatus 200 includes a communication unit 210, an input unit 220, a display unit 230, a storage unit 240, and a control unit 250.

Description regarding the communication unit 210, the input unit 220, and the display unit 230 are similar to the description regarding the communication unit 110, the input unit 120, and the display unit 130 described in the first embodiment.

The storage unit 240 includes training data 241, an image table 242, a feature extraction model 243, and an estimation model 244. The storage unit 240 corresponds to a semiconductor memory element such as a RAM or a flash memory, or a storage device such as an HDD.

The training data 241 is data used in a case where machine learning is executed. FIG. 14 is a diagram illustrating one example of a data structure of the training data according to the present second embodiment. As illustrated in FIG. 14, the training data 241 holds an item number, input data, and correct answer data (GT) in association with each other. The input data includes background image data for learning and target image data for learning. The correct answer data includes GT of a BBOX (coordinates of a region of an object).

The image table 242 is a table that holds background image data and target image data used at the time of inference.

The feature extraction model 243 is a machine learning model (CNN) executed by the feature extraction units 50*a* and 50*b*. When image data is input to the feature extraction model 243, an image feature is output.

The estimation model 244 is a machine learning model (CNN) executed by the estimation unit 52. When a background image feature and a target image feature are input to the estimation model 244, a BBOX is output.

The control unit 250 includes an acquisition unit 251, a learning processing unit 252, and an inference processing unit 253. The control unit 250 corresponds to a CPU or the like.

The acquisition unit 251 registers, in the case of acquiring the training data 241 from an external device or the like, the acquired training data 241 in the storage unit 240.

The acquisition unit 251 previously acquires background image data from the camera 10, and registers the background image data in the image table 242. The acquisition unit 251 acquires target image data from the camera 10, and registers the target image data in the image table 242.

The learning processing unit 252 executes machine learning of the feature extraction units 50*a* and 50*b* (feature extraction model 243) and the estimation unit 52 (estimation model 244) on the basis of the training data 241.

Figure 15:
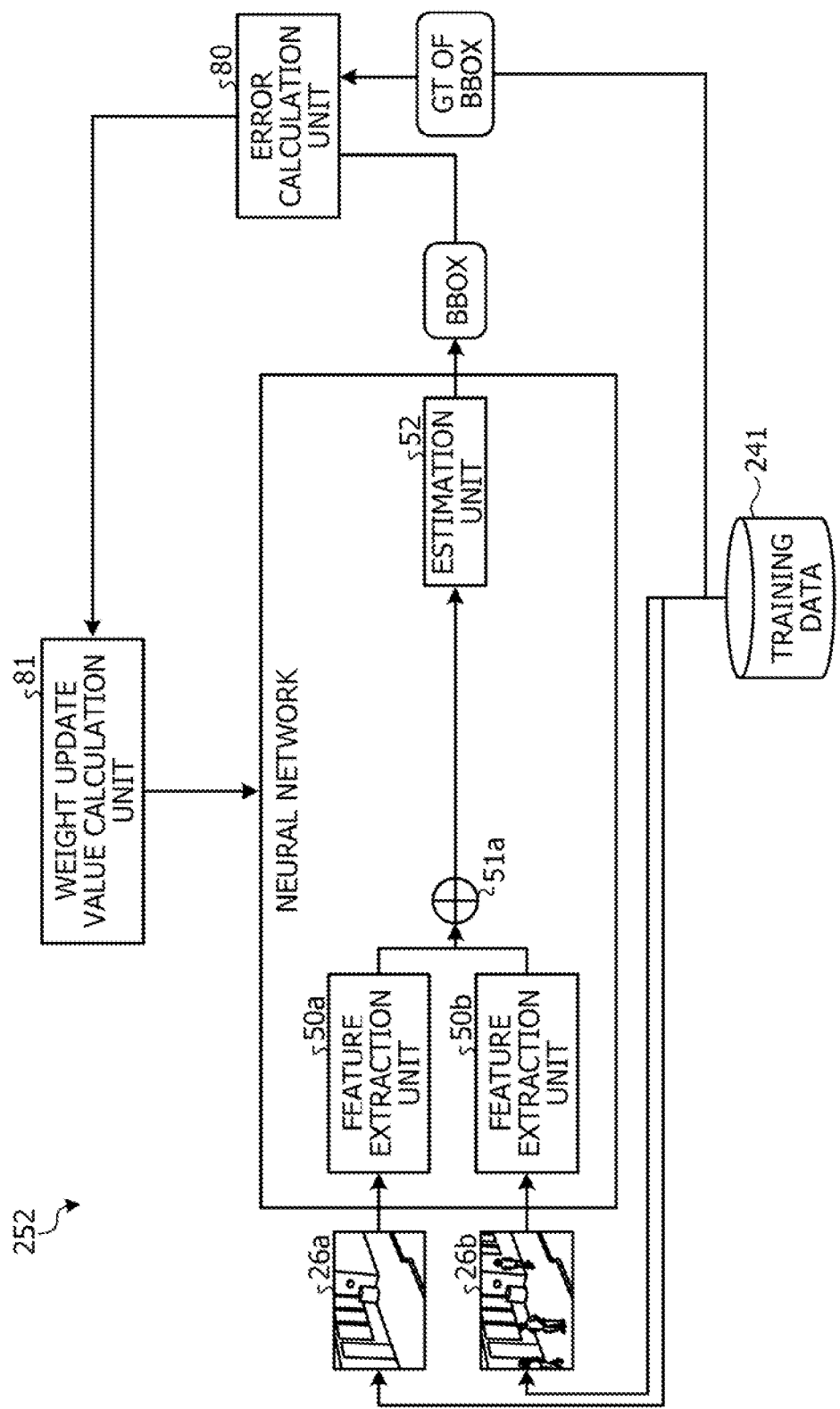
FIG. 15 is a diagram for describing processing of a learning processing unit according to the present second embodiment.

FIG. 15 is a diagram for describing processing of the learning processing unit according to the present second embodiment. For example, the learning processing unit 252 includes the feature extraction units 50*a* and 50*b*, a combination unit 51*a*, and the estimation unit 52. Furthermore, the learning processing unit 252 includes an error calculation unit 80 and a weight update value calculation unit 81. In the following description, the feature extraction units 50*a* and 50*b* and the estimation unit 52 are collectively referred to as a "neural network" as appropriate.

The processing of the feature extraction units 50*a* and 50*b* is similar to that in the description given in FIG. 2. For example, the feature extraction units 50*a* and 50*b* read and execute the feature extraction model 243. The feature extraction units 50*a* and 50*b* input image data to the feature extraction model 243, and calculate an image feature on the basis of parameters of the feature extraction model 243.

The combination unit 51*a* combines a background image feature and a target image feature, and outputs a feature obtained by the combination to the estimation unit 52.

The estimation unit 52 reads and executes the estimation model 244. The estimation unit 52 reads and executes the estimation model 244. The estimation unit 52 inputs a feature obtained by combination to the estimation model 244, and specifies a BBOX of each object on the basis of parameters of the estimation model 244. The estimation model 244 outputs the BBOX to the error calculation unit 80.

The learning processing unit 252 acquires background image data 26*a* for learning from the training data 241, and inputs the background image data 26*a* for learning to the feature extraction unit 50*a*. The learning processing unit 252 acquires target image data 26*b* for learning from the training data 241, and inputs the target image data 26*b* for learning to the feature extraction unit 50*b*. The learning processing unit 252 acquires GT of a BBOX from the training data 241, and inputs the GT of the BBOX to the error calculation unit 80.

The error calculation unit 80 calculates an error between a BBOX output from the estimation unit 52 and GT of a BBOX of the training data 241. The error calculation unit 80 outputs the calculated error to the weight update value calculation unit 81.

The weight update value calculation unit 81 updates parameters (weights) of the neural network so that an error becomes small. For example, the weight update value calculation unit 81 updates parameters of the feature extraction units 50*a* and 50*b* (feature extraction model 243) and the estimation unit 52 (estimation model 244) by using an error back propagation method or the like.

The learning processing unit 252 repeatedly executes the processing described above by using each piece of input data and correct answer data stored in the training data 241. The learning processing unit 252 registers the machine-learned feature extraction model 243 and estimation model 244 in the storage unit 240.

The description returns to FIG. 13. The inference processing unit 253 specifies a region of an object that does not exist in background image data but exists in target image data by using the machine-learned feature extraction units 50*a* and 50*b* (feature extraction model 243) and estimation unit 52 (estimation model 244).

Figure 16:
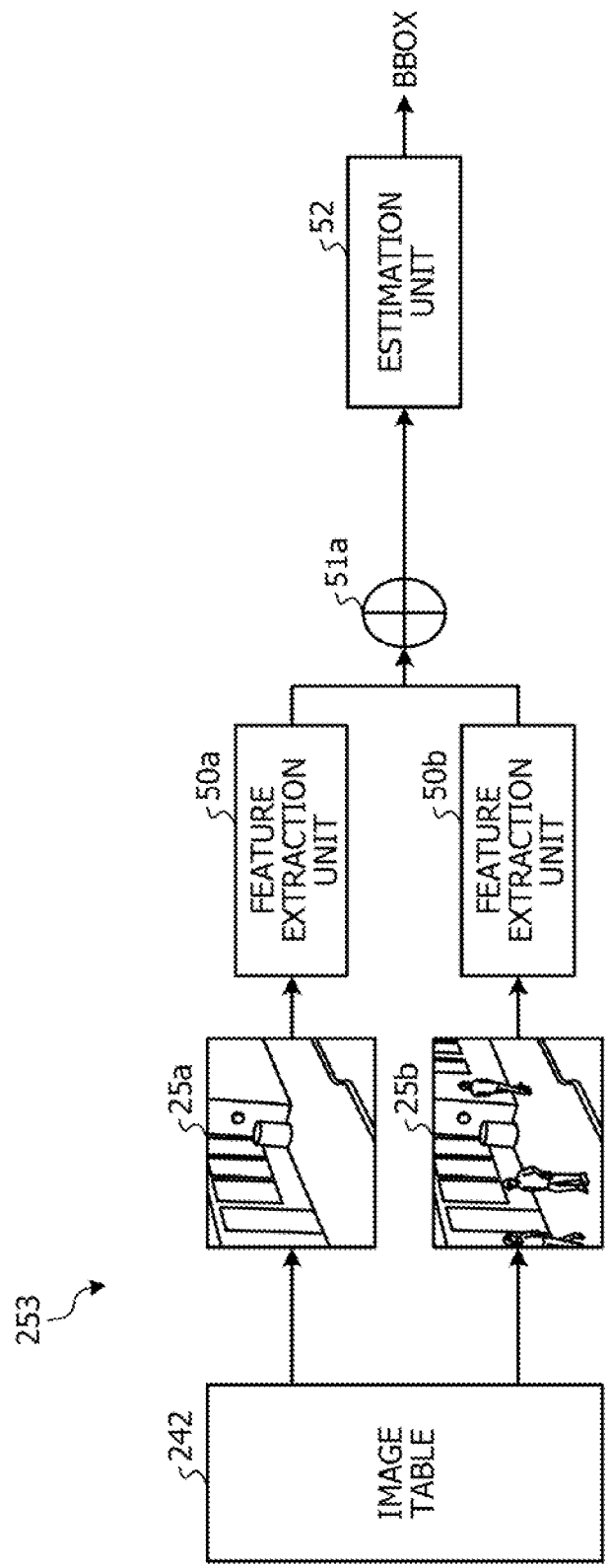
FIG. 16 is a diagram for describing processing of an inference processing unit according to the present second embodiment.

FIG. 16 is a diagram for describing processing of the inference processing unit according to the present second embodiment. For example, the inference processing unit 253 includes the feature extraction units 50*a* and 50*b*, the combination unit 51*a*, and the estimation unit 52.

The processing of the feature extraction units 50*a* and 50*b* is similar to that in the description given in FIG. 2. For example, the feature extraction units 50*a* and 50*b* read and execute the machine-learned feature extraction model 243. The feature extraction units 50*a* and 50*b* input image data to the feature extraction model 243, and calculate an image feature on the basis of parameters of the feature extraction model 243.

The combination unit 51*a* combines a background image feature and a target image feature, and outputs a feature obtained by the combination to the estimation unit 52.

The processing of the estimation unit 52 is similar to that in the description given in FIG. 2. For example, the estimation unit 52 reads and executes the trained estimation model 244. The estimation unit 52 reads and executes the estimation model 244. The estimation unit 52 inputs information obtained by combining a background image feature and a target image feature to the estimation model 244, and specifies a BBOX of each object on the basis of parameters of the estimation model 244.

The inference processing unit 253 acquires background image data 25a from the image table 242, and inputs the background image data 25a to the feature extraction unit 50a. The inference processing unit 253 acquires target image data 25b from the image table 242, and inputs the target image data 25b to the feature extraction unit 50b. The inference processing unit 253 may output information regarding a BBOX specified by the estimation unit 52 to the display unit 230 or to an external device.

Next, one example of a processing procedure of the information processing apparatus 200 according to the present second embodiment will be described. In the following, a processing procedure of learning processing and a processing procedure of inference processing executed by the information processing apparatus 200 will be described in order.

Figure 17:
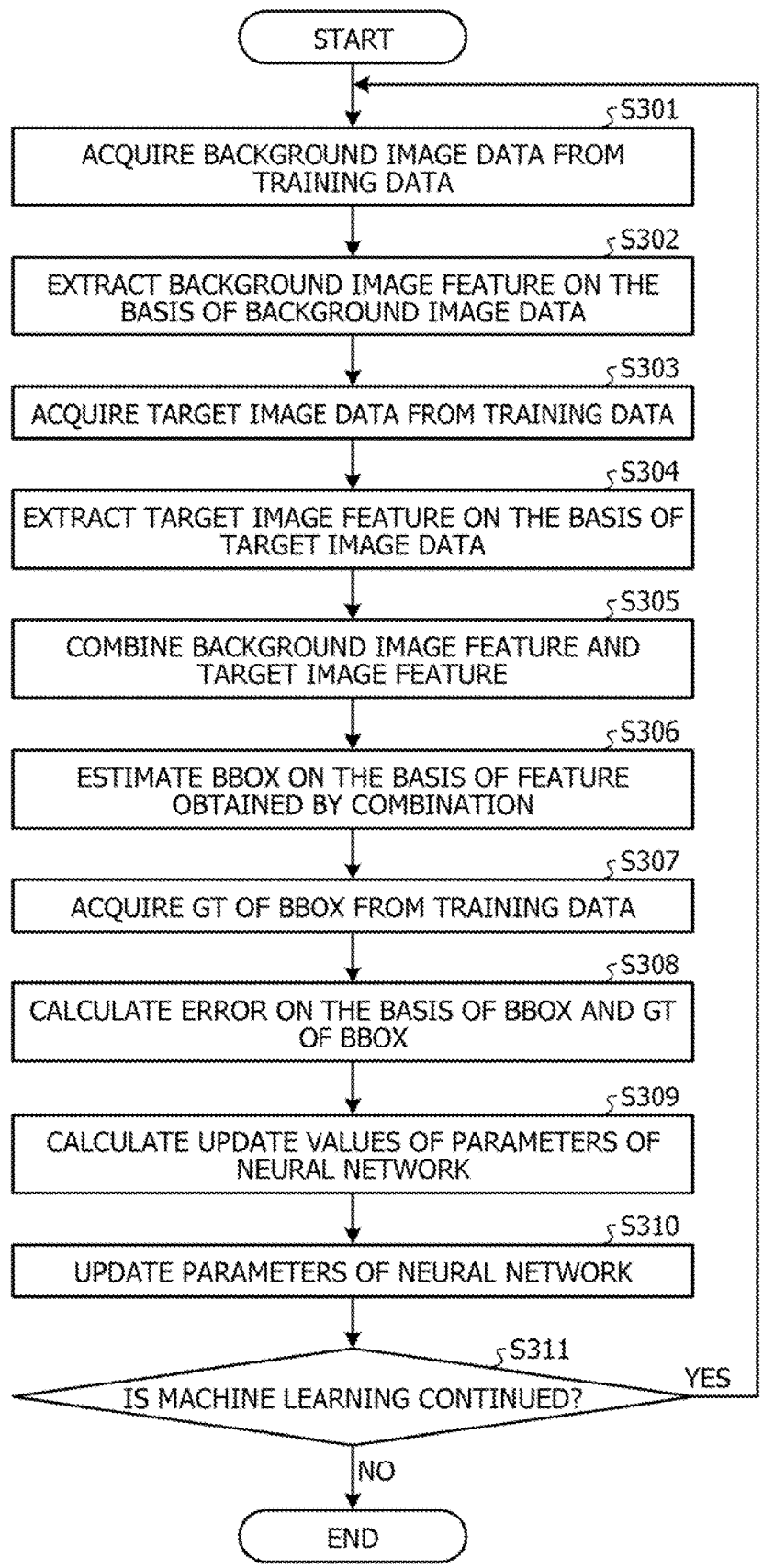
FIG. 17 is a flowchart illustrating a processing procedure of learning processing according to the present second embodiment.

The processing procedure of the learning processing will be described. FIG. 17 is a flowchart illustrating the processing procedure of the learning processing according to the present second embodiment. As illustrated in FIG. 17, the learning processing unit 252 of the information processing apparatus 200 acquires background image data from the training data 241 (Step S301). The feature extraction unit 50a of the learning processing unit 252 extracts a background image feature on the basis of the background image data (Step S302).

The learning processing unit 252 acquires target image data from the training data 241 (Step S303). The feature extraction unit 50b of the learning processing unit 252 extracts a target image feature on the basis of the target image data (Step S304).

The combination unit 51a of the learning processing unit 252 combines the background image feature and the target image feature (Step S305). The estimation unit 52 of the learning processing unit 252 estimates a BBOX on the basis of a feature obtained by the combination (Step S306).

The learning processing unit 252 acquires GT of a BBOX from the training data 241 (Step S307). The error calculation unit 80 calculates an error on the basis of the BBOX and the GT of the BBOX (Step S308).

The weight update value calculation unit 81 of the learning processing unit 252 calculates update values of parameters of the neural network (Step S309). The learning processing unit 252 updates the parameters of the neural network (Step S310).

In a case where machine learning is continued (Step S311, Yes), the learning processing unit 252 proceeds to Step S301. In a case where the machine learning is not continued (Step S311, No), the machine learning of the neural network is terminated.

Figure 18:
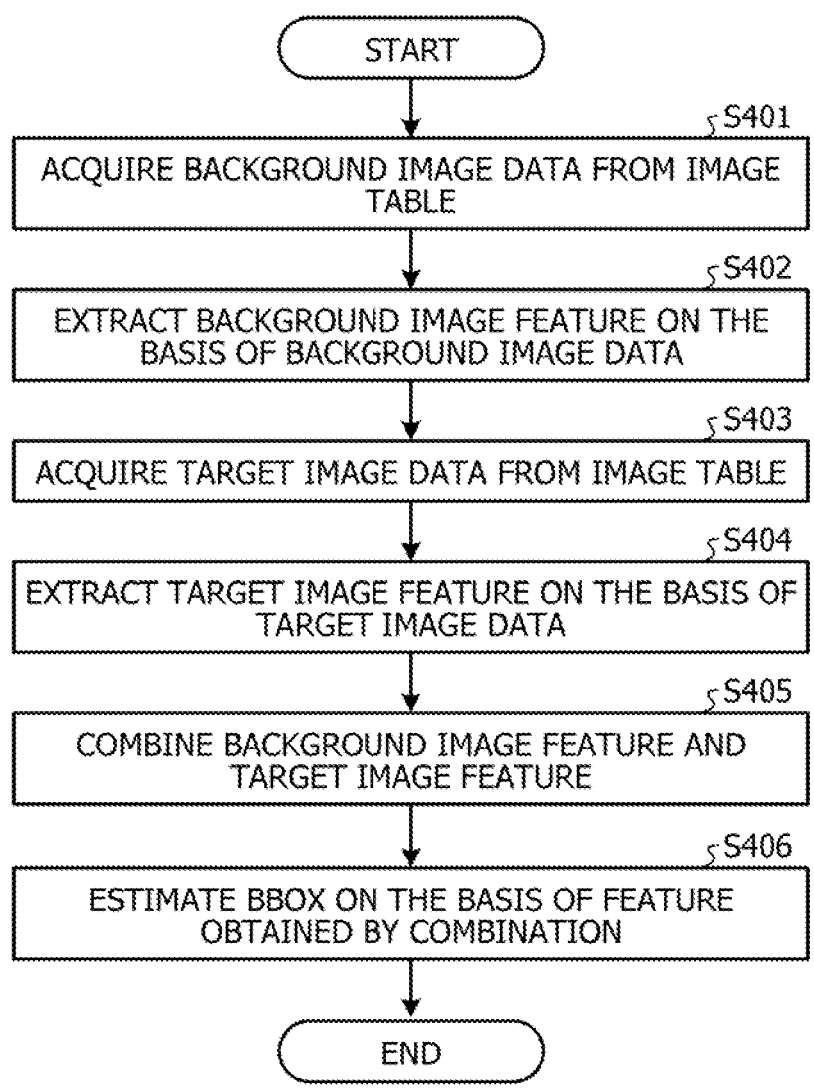
FIG. 18 is a flowchart illustrating a processing procedure of inference processing according to the present second embodiment.

Subsequently, the processing procedure of the inference processing will be described. FIG. 18 is a flowchart illustrating the processing procedure of the inference processing according to the present second embodiment. As illustrated in FIG. 18, the inference processing unit 253 of the information processing apparatus 200 acquires background image data from the image table 242 (Step S401). The feature extraction unit 50a of the inference processing unit 253 extracts a background image feature on the basis of the background image data (Step S402).

The inference processing unit 253 acquires target image data from the image table 242 (Step S403). The feature extraction unit 50b of the inference processing unit 253 extracts a target image feature on the basis of the target image data (Step S404).

The combination unit 51a of the inference processing unit 253 combines the background image feature and the target image feature (Step S405).

The estimation unit 52 of the inference processing unit 253 estimates a BBOX on the basis of a feature obtained by the combination (Step S406).

Next, effects of the information processing apparatus 200 according to the present second embodiment will be described. The information processing apparatus 200 extracts a background image feature and a target image feature by inputting background image data to the feature extraction unit 50a and inputting target image data to the feature extraction unit 50b. The information processing apparatus 200 specifies a region of an object by inputting a feature obtained by combining the background image feature and the target image feature to the estimation unit 52. With this configuration, even when an object included in the target image data is an unknown object that has not been learned previously, each object may be discriminated and detected.

Third Embodiment

Figure 19:
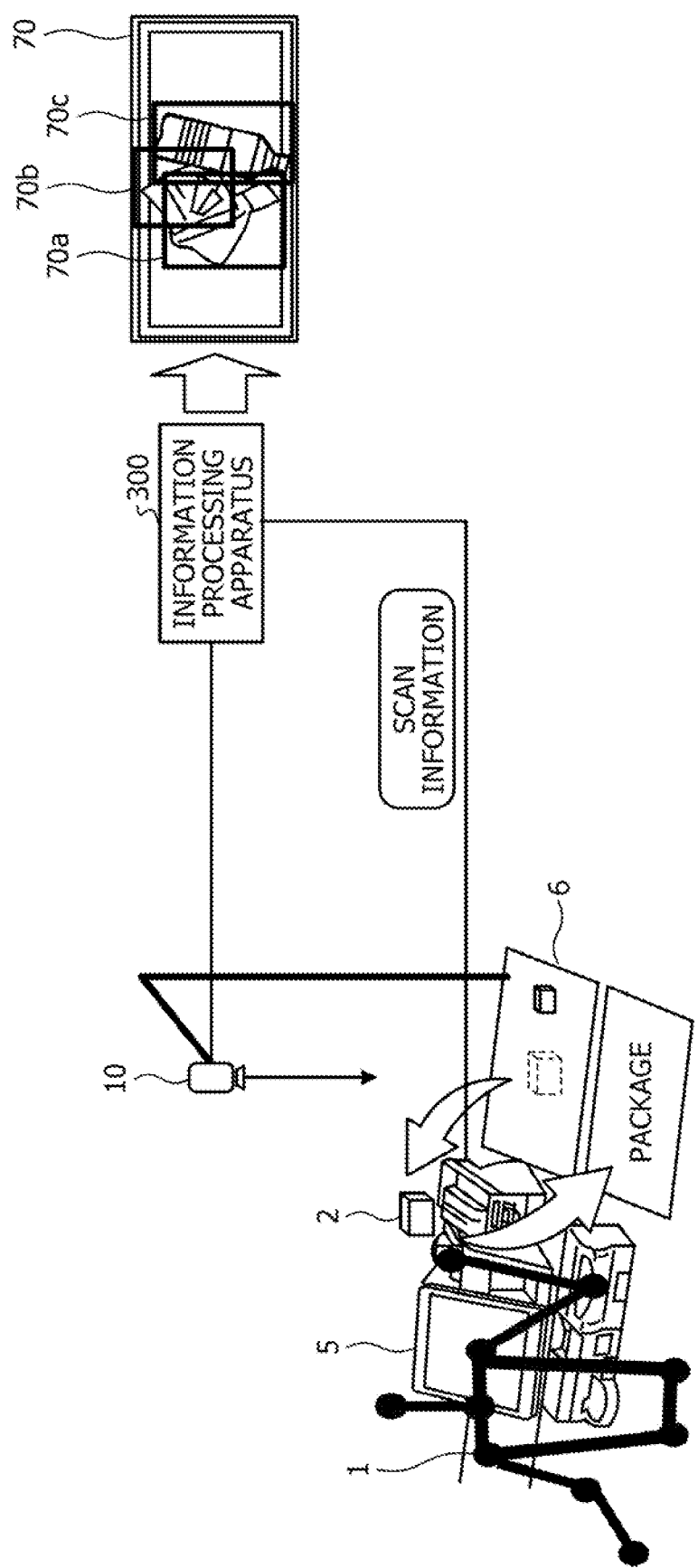
FIG. 19 is a diagram illustrating a system according to a present third embodiment.

Next, one example of a system according to a present third embodiment will be described. FIG. 19 is a diagram illustrating the system according to the present third embodiment. As illustrated in FIG. 19, the system includes a self-checkout machine 5, a camera 10, and an information processing apparatus 300. The self-checkout machine 5, the camera 10, and the information processing apparatus 300 are connected in a wired or wireless manner.

It is assumed that a user 1 picks up a product 2 placed on a temporary placement table 6, performs operation to scan a barcode of the product 2 against the self-checkout machine 5, and packages the product 2.

The self-checkout machine 5 is a point of sale (POS) checkout system by which the user 1 who purchases the product performs from reading of the barcode of the product to payment. For example, when the user 1 moves the product to be purchased to a scan region of the self-checkout machine 5, the self-checkout machine 5 scans the barcode of the product. When the scanning by the user 1 is completed, the self-checkout machine 5 notifies the information processing apparatus 300 of information regarding the number of products scanned. In the following description, information regarding the number of products scanned is referred to as "scan information".

The camera 10 is a camera that captures the temporary placement table 6 of the self-checkout machine 5. The camera 10 transmits image data in an image capturing range to the information processing apparatus 300. It is assumed that the camera 10 transmits image data (background image data) of the temporary placement table 6 on which a product is not placed to the information processing apparatus 300 in advance. In a case where a product to be purchased is placed on the temporary placement table 6, the camera 10 transmits image data (target image data) of the temporary placement table 6 to the information processing apparatus 300.

The information processing apparatus 300 performs machine learning of a neural network in a similar manner to the information processing apparatus 100 described in the first embodiment. The neural network includes feature extraction units 50a and 50b, combination units 51a and 51b, an estimation unit 52, a position coordinate feature output unit 53, and a mask generation unit 54.

The information processing apparatus 300 specifies each object included in target image data by inputting background image data and the target image data to the machine-learned neural network. The information processing apparatus 300 counts the specified objects to specify the number of products. The information processing apparatus 300 detects scan omission in a case where the specified number of products does not match the number of products included in scan information.

For example, the information processing apparatus 300 uses a result of inputting the background image data and the target image data to the neural network as an output result 70. Since the output result 70 includes three BBOXes of BBOX 70a, 70b, and 70c, the information processing apparatus 300 specifies the number of products as "3". The information processing apparatus 300 detects scan omission in a case where the number of products included in the scan information is less than "3". The information processing apparatus 300 may notify a management server or the like (not illustrated) of the scan omission.

As described above, by applying the information processing apparatus 100 (200) described in the first and second embodiments to the system illustrated in FIG. 19, it is possible to detect fraud of a user, such as not reading a barcode.

Figure 20:
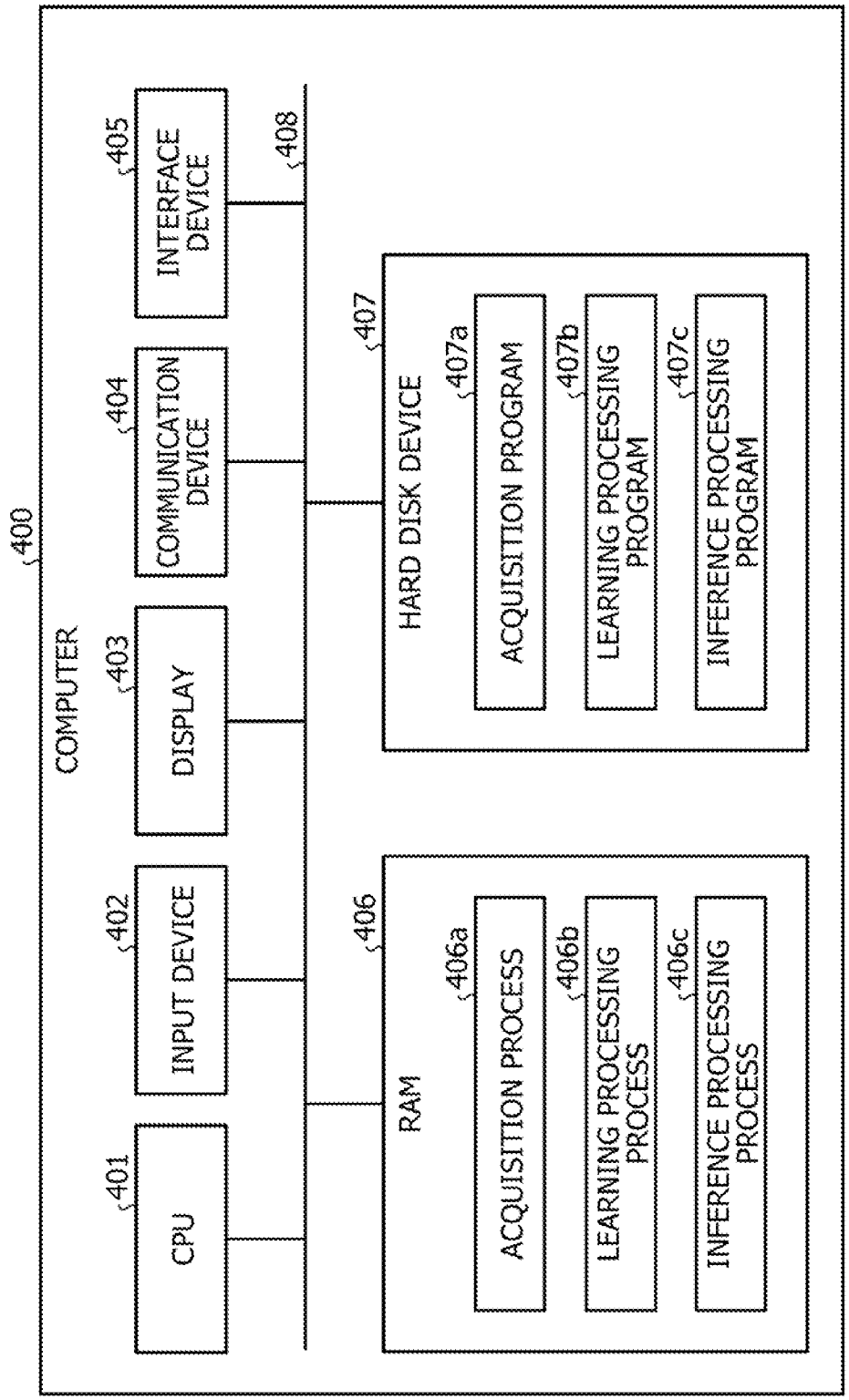
FIG. 20 is a diagram illustrating one example of a hardware configuration of a computer that implements functions similar to those of the information processing apparatus.

Next, one example of a hardware configuration of a computer that implements functions similar to those of the information processing apparatus 100 (200, 300) described in the embodiments described above will be described. FIG. 20 is a diagram illustrating the one example of the hardware configuration of the computer that implements the functions similar to those of the information processing apparatus.

As illustrated in FIG. 20, a computer 400 includes a CPU 401 that executes various types of arithmetic processing, an input device 402 that receives data input from a user, and a display 403. Furthermore, the computer 400 includes a communication device 404 that receives distance image data from the camera 10 and an interface device 405 connected to various devices. The computer 400 includes a RAM 406 that temporarily stores various types of information, and a hard disk device 407. Additionally, each of the devices 401 to 407 is connected to a bus 408.

The hard disk device 407 includes an acquisition program 407a, a learning processing program 407b, and an inference processing program 407c. The CPU 401 reads the acquisition program 407a, the learning processing program 407b, and the inference processing program 407c and expands them in the RAM 406.

The acquisition program 407a functions as an acquisition process 406a. The learning processing program 407b functions as a learning processing process 406b. The inference processing program 407c functions as an inference processing process 406c.

Processing of the acquisition process 406a corresponds to the processing of the acquisition unit 151 or 251. Processing of the learning processing process 406b corresponds to the processing of the learning processing unit 152 or 252. Processing of the inference processing process 406c corresponds to the processing of the inference processing unit 153 or 253.

Note that each of the programs 407a to 407c do not necessarily need to be stored in the hard disk device 407 beforehand. For example, each of the programs is stored in a "portable physical medium" such as a flexible disk (FD), a compact disc read only memory (CD-ROM), a digital versatile disk (DVD), a magneto-optical disk, or an integrated circuit (IC) card to be inserted in the computer 400. Then, the computer 400 may read each of the programs 407a to 407c and execute the programs.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing an inference program for causing a computer to execute processing comprising:

acquiring a background image in which a target area in which an object is arranged is captured, and a target image in which the object and the area are captured;

generating an intermediate feature by inputting the background image and the target image to a feature extraction model;

generating a mask image that indicates a region of an object that does not exist in the background image and exists in the target image by inputting the intermediate feature to a generation model; and specifying the object that does not exist in the background image and exists in the target image by inputting the generated mask image, the intermediate feature, a coordinate feature in which coordinate values are arranged in an image plane and a distance feature in which coordinate values are set in an outward direction from a central pixel to an estimation model, generating combination information by combining the generated mask image, the intermediate feature, the coordinate feature and the distance feature and performing convolution while moving a position of a kernel in which parameters are set in the combination information.

2. A non-transitory computer-readable recording medium storing a learning program for causing a computer to execute processing comprising:

acquiring training data in which a background image in which a target area in which an object is arranged is captured and a target image in which the object and the area are captured are used as input data, and a region of an object that does not exist in the background image and exists in the target image and a position of the object included in the target image are used as correct answer data; and executing machine learning for a feature extraction model that outputs an intermediate feature by inputting the background image and the target image on the basis of the training data, a generation model that outputs a mask image that indicates a region of an object that does not exist in the background image and exists in the target image by inputting the intermediate feature, and an estimation model that outputs a position of the object that does not exist in the background image and exists in the target image by inputting the mask image, the intermediate feature, a coordinate feature in which coordinate values are arranged in an image plane and a distance feature in which coordinate values are set in an outward direction from a central pixel to an estimation model, generating combination information by combining the generated mask image, the intermediate feature, the coordinate feature and the distance feature and performing convolution while moving a position of a kernel in which parameters are set in the combination information.

3. The non-transitory computer-readable recording medium according to claim 2, wherein, in the processing of executing machine learning, parameters of the feature extraction model, parameters of the generation model, and parameters of the estimation model are trained such that a difference between a region of an object output from the generation model and a region of an object in the correct answer data and a difference between a position of an object output from the estimation model and the correct answer data become small.

4. An inference method comprising:
acquiring, by a computer, a background image in which a target area in which an object is arranged is captured, and a target image in which the object and the area are captured;
generating an intermediate feature by inputting the background image and the target image to a feature extraction model;
generating a mask image that indicates a region of an object that does not exist in the background image and exists in the target image by inputting the intermediate feature to a generation model; and
specifying the object that does not exist in the background image and exists in the target image by inputting the generated mask image, the intermediate feature, a coordinate feature in which coordinate values are arranged in an image plane and a distance feature in which coordinate values are set in an outward direction from a central pixel to an estimation model, generating combination information by combining the generated mask image, the intermediate feature, the coordinate feature and the distance feature and performing convolution while moving a position of a kernel in which parameters are set in the combination information.

* * * * *